US009167404B1

(12) United States Patent
Freed et al.

(10) Patent No.: US 9,167,404 B1
(45) Date of Patent: Oct. 20, 2015

(54) ANTICIPATING DATA USE IN A WIRELESS DEVICE

(71) Applicants: Ian W Freed, Seattle, WA (US); Keela N Robison, Seattle, WA (US)

(72) Inventors: Ian W Freed, Seattle, WA (US); Keela N Robison, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 268 days.

(21) Appl. No.: 13/626,734

(22) Filed: Sep. 25, 2012

(51) Int. Cl.
H04W 4/24 (2009.01)

(52) U.S. Cl.
CPC ........................................ H04W 4/24 (2013.01)

(58) Field of Classification Search
None
See application file for complete search history.

(56) References Cited

U.S. PATENT DOCUMENTS

| | | | |
|---|---|---|---|
| 4,430,004 A | 2/1984 | Nitschke | |
| 6,593,942 B1 | 7/2003 | Bushmitch et al. | |
| 7,069,315 B1 * | 6/2006 | Harris | 709/224 |
| 8,054,950 B1 * | 11/2011 | Hung et al. | 379/88.17 |
| 8,237,655 B2 | 8/2012 | Yabe et al. | |
| 8,522,163 B2 | 8/2013 | Relyear et al. | |
| 8,526,675 B2 | 9/2013 | Ruan | |
| 8,570,993 B2 * | 10/2013 | Austin et al. | 370/338 |
| 8,613,018 B2 | 12/2013 | Kim et al. | |
| 8,627,236 B2 | 1/2014 | Jung et al. | |
| 2003/0007420 A1 | 1/2003 | Shteyn | |
| 2004/0192384 A1 * | 9/2004 | Anastasakos et al. | 455/557 |
| 2004/0203732 A1 * | 10/2004 | Brusilovsky et al. | 455/426.1 |
| 2006/0034161 A1 | 2/2006 | Muller | |
| 2006/0077897 A1 * | 4/2006 | Kotzin | 370/235 |
| 2006/0168545 A1 | 7/2006 | Niittynen et al. | |
| 2006/0277271 A1 * | 12/2006 | Morse et al. | 709/217 |
| 2007/0047523 A1 * | 3/2007 | Jiang | 370/352 |
| 2007/0167174 A1 * | 7/2007 | Halcrow et al. | 455/456.2 |
| 2008/0022365 A1 | 1/2008 | Chae et al. | |
| 2008/0081597 A1 * | 4/2008 | Cole | 455/414.1 |
| 2008/0186275 A1 | 8/2008 | Anderson | |
| 2008/0304458 A1 * | 12/2008 | Aghvami et al. | 370/338 |
| 2009/0070708 A1 * | 3/2009 | Finkelstein | 715/789 |
| 2009/0124284 A1 * | 5/2009 | Scherzer et al. | 455/552.1 |
| 2009/0176520 A1 * | 7/2009 | B. S. et al. | 455/466 |
| 2009/0254856 A1 * | 10/2009 | Cwajbaum | 715/808 |
| 2010/0223096 A1 * | 9/2010 | Bosan et al. | 705/10 |
| 2011/0029670 A1 * | 2/2011 | Klein et al. | 709/225 |
| 2011/0106736 A1 * | 5/2011 | Aharonson et al. | 706/12 |
| 2011/0211754 A1 | 9/2011 | Litrak et al. | |
| 2011/0261048 A1 | 10/2011 | Lee et al. | |

(Continued)

OTHER PUBLICATIONS

U.S. Appl. No. 13/352,087, filed Jan. 17, 2012, Zhou et al., "Managing Resource Usage for Task Performance."

(Continued)

*Primary Examiner* — Mehmood B Khan
(74) *Attorney, Agent, or Firm* — Athorus, PLLC

(57) ABSTRACT

This application describes, in part, systems and methods that may be used to proactively deliver anticipated data to a mobile device while the mobile device is connected to a wireless network that will not result in a charge for transmitting the data. In one example, data that may be accessed by a user of the mobile device and a time of that likely access is determined. In addition, anticipated wireless network connection events are determined to identify times when the wireless device will likely be connected to a fixed fee wireless network. Based on the determined information, the anticipated data is scheduled for delivery during a fixed fee wireless network connection event that occurs prior to the time at which the anticipated data is requested by the user of the mobile device.

19 Claims, 13 Drawing Sheets

(56) References Cited

U.S. PATENT DOCUMENTS

| | | | |
|---|---|---|---|
| 2012/0020300 A1* | 1/2012 | Sheriff et al. | 370/328 |
| 2012/0056878 A1 | 3/2012 | Miyazawa et al. | |
| 2012/0066629 A1 | 3/2012 | Lee et al. | |
| 2012/0066648 A1 | 3/2012 | Rolleston et al. | |
| 2012/0084734 A1 | 4/2012 | Wilairat | |
| 2012/0154301 A1 | 6/2012 | Kang et al. | |
| 2012/0154378 A1 | 6/2012 | Kitchens | |
| 2013/0004016 A1 | 1/2013 | Karakotsios et al. | |
| 2013/0114522 A1* | 5/2013 | Frenne et al. | 370/329 |
| 2013/0170324 A1 | 7/2013 | Tu et al. | |
| 2013/0170396 A1* | 7/2013 | Dinan | 370/254 |
| 2013/0208888 A1* | 8/2013 | Agrawal et al. | 380/255 |
| 2013/0235069 A1 | 9/2013 | Ubillos et al. | |
| 2013/0250882 A1* | 9/2013 | Dinan | 370/329 |
| 2013/0267207 A1* | 10/2013 | Hao et al. | 455/414.1 |
| 2013/0295927 A1* | 11/2013 | Ekici et al. | 455/434 |
| 2013/0322419 A1* | 12/2013 | Fedotenko | 370/338 |
| 2014/0063048 A1* | 3/2014 | Somerfield et al. | 345/619 |

OTHER PUBLICATIONS

Empson, Rip, "Read Offline: News.me Automatically Downloads Your News Whenever You Leave Home", "TechCrunch", Apr. 22, 2012, p. 2, Publisher: www.TechCrunch.com, Published in: US.

U.S. Appl. No. 12/180,325, filed Jul. 25, 2008, Narasimhan et al., "Communication Management Based on Communication Events".

U.S. Appl. No. 12/273,473, filed Nov. 18, 2008, Kessel et al., "Synchronization of Digital Content".

U.S. Appl. No. 13/552,213, filed Jul. 18, 2012, Dong Zhou et al., "Custom Color Spectrum for Skin Detection."

U.S. Appl. No. 13/603,245, filed Sep. 4, 2012, Isaac J. Shepard et al., "Device Access Control."

U.S. Appl. No. 13/603,259, filed Sep. 4, 2012, Timothy T. Gray, "Providing Time-Dependent Items."

* cited by examiner

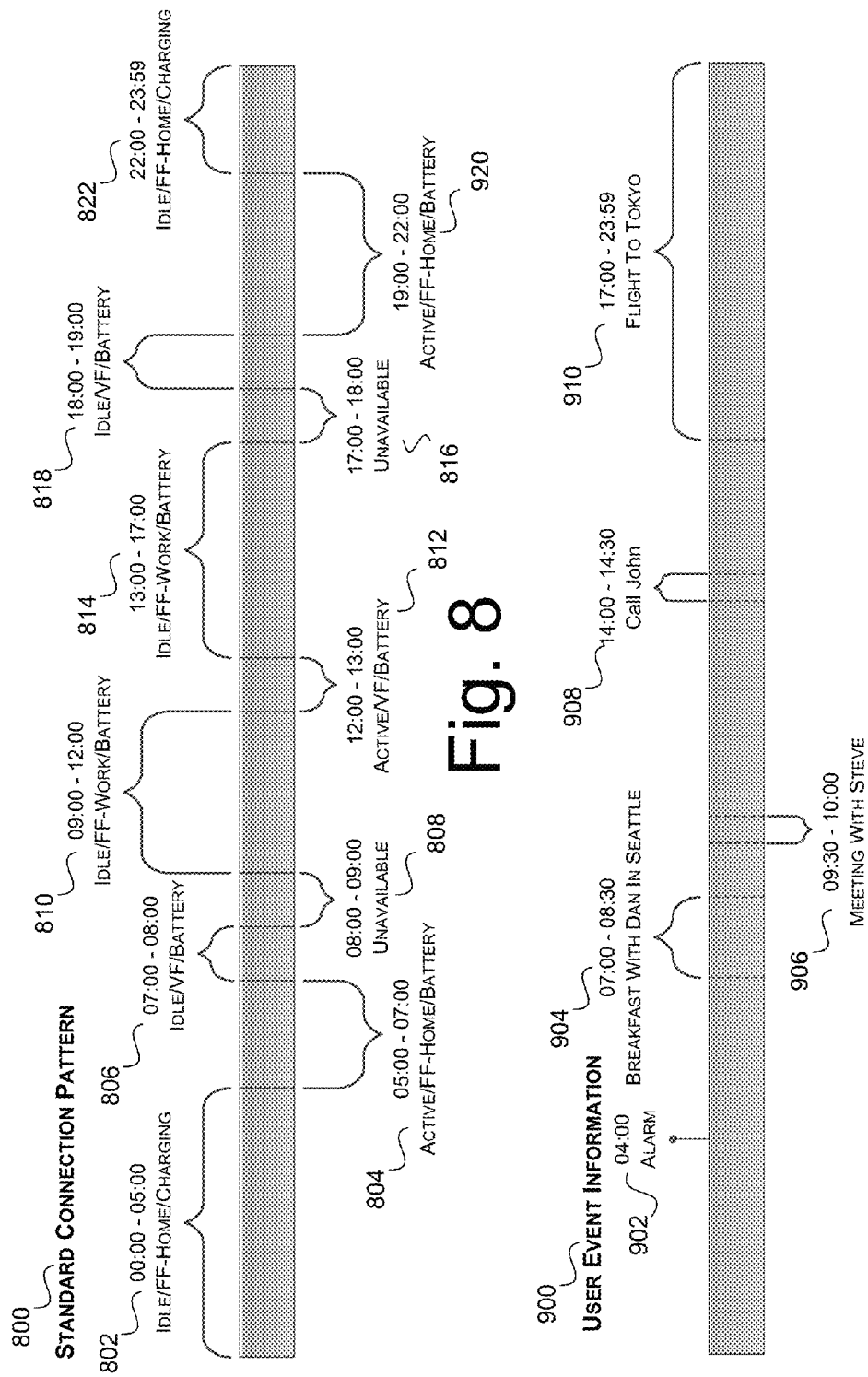

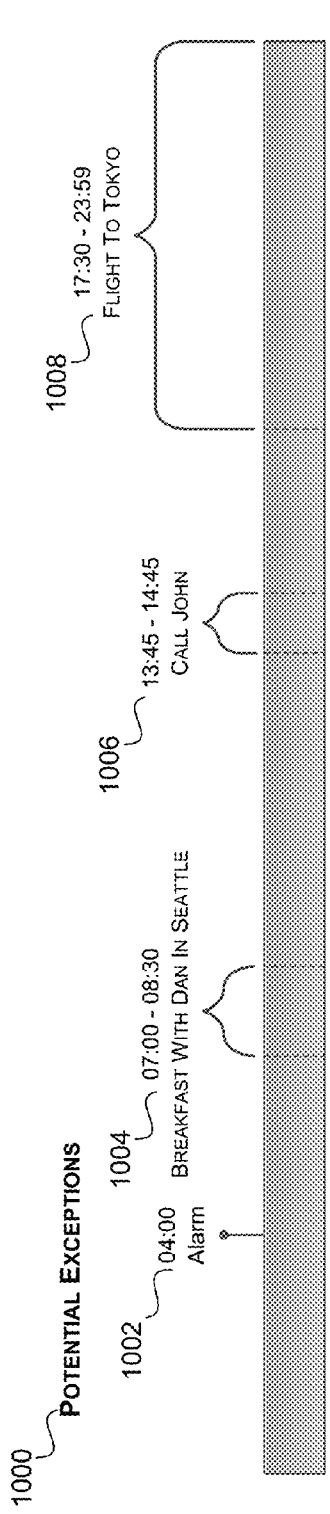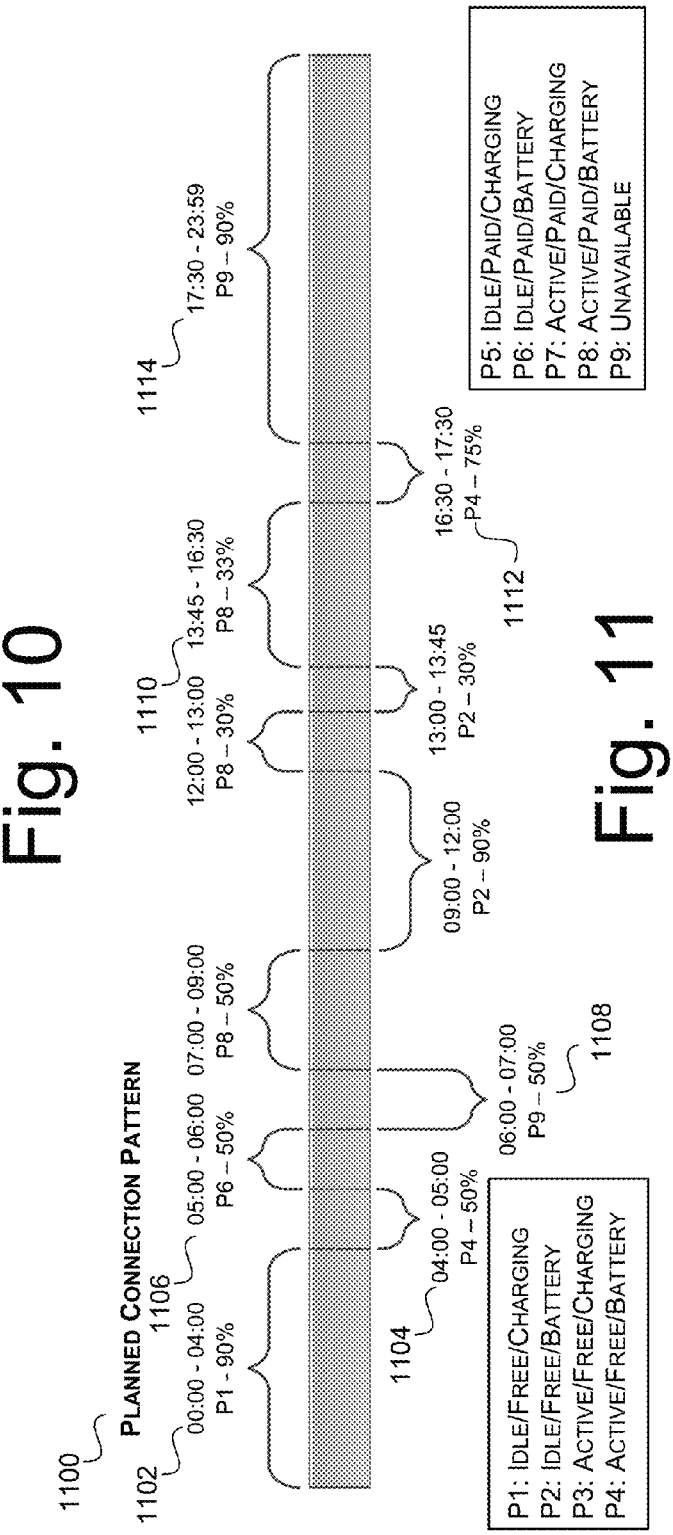

ANTICIPATING DATA USE IN A WIRELESS DEVICE

BACKGROUND

Generally described, computing devices and communication networks facilitate the collection and exchange of information. In a common application, computing devices, such as personal computing devices, can utilize a wide area communication network, generally referred to as the Internet, to access data, or other data, from other computing devices associated with data providing entities. The type of data exchanged between the computing devices can vary according to the specific design/function of the computing device and the type of data provided by the data providing entity.

In one application, users can request data from a data providing entity that is delivered to the computing device in a relatively "real time" basis. For example, users can request data from a network resource (e.g., a Web site) for immediate rendering on a computing device display screen or they can request the immediate transfer of data, such as a document or data file, from a network resource or Web service for storage on the computing device. In another example, users can transmit a request, or initiate a transaction, that results in the downloading or streaming of data to a computing device. Typically, the data providing entity would initiate such a transfer upon receipt of the request from the computing device.

In another application, the data transmission from the data providing entity to the computing device can be scheduled for delivery to the computing device at a specific time or upon satisfaction of a scheduling event. For example, users can specify a time, or other event, to receive software updates provided by a data providing entity. In another example, users can specify a specific time to receive data or updates to previously delivered data such as periodicals, data posted on a network resource such as web logs, bulletin boards, and the like. In still a further application, data providing entities can initiate data deliveries to the computing device without requiring a prior request from the receiving computing device. For example, a data providing entity may wish to schedule the delivery of advertisement data to a set of personal computing devices.

In one embodiment, wireless computing devices can access data from data providing entities via a communication network. In such an embodiment, the wireless computing device is generally a portable device that includes communication hardware and software components that establish a wireless network connection for exchanging data, such as a connection with a wide area wireless telecommunication network ("WAN"), like a long term evolution (LTE) based wireless network and/or a wireless local area network ("WLAN"), such as Wi-Fi based wireless network.

With the continued increase of data transmitted over wireless networks, operators of many networks now charge a fee, such as a subscription fee or data transmission fee, to deliver data over the network. For example, many WAN operators charge monthly fees for delivery of data over the network and limit the amount of data that can be transmitted without incurring additional fees. This may be in the form of a monthly fee allowing up to a certain amount of data transmission, with additional fees incurred if the monthly amount is exceeded, or in the form of a fee based on the amount data transmitted. For purposes of this disclosure, any wireless network in which a fee is incurred for the transmission of data that includes either a data limit or a fee per data transmitted will be referred to herein as a "variable fee wireless network."

In comparison, any wireless network in which there is no fee for data transmitted over the network, or there is no limit on the amount of data that can be transmitted for a fixed fee, is referred to herein as a "fixed fee wireless network." Examples of fixed fee wireless networks include, but are not limited to a user's home WLAN, a fixed fee WLAN network (e.g., at a coffee shop or airport), or an unlimited data plan with a WAN operator in which there is no limit to the amount of data that can be transmitted each month without incurring additional fees or charges.

Because of the nature of wireless network connections, the quality and availability of the connection experienced by the wireless device can vary for both variable fee wireless networks and fixed fee wireless networks. Factors that can influence such quality and availability include the range of the antennas through which the wireless connection is established, physical obstructions (e.g., natural geographical obstructions/structures, manmade structures and impediments, etc.), legal or administrative limitations to the use of wireless networks (e.g., limited or no wireless communications in hospitals and airplanes), wireless network service provider limitations (e.g., wireless network coverage), user-initiated actions (e.g., shutting off the device or disabling the wireless network functionality), and the like.

BRIEF DESCRIPTION OF THE DRAWINGS

The detailed description is set forth with reference to the accompanying figures. In the figures, the left-most digit(s) of a reference number identifies the figures in which the reference number first appears. The use of the same reference numbers in different figures indicates similar or identical items.

FIG. 8 is a block diagram of a device's determined standard connection pattern for a twenty-four hour period, according to an implementation.

FIG. 9 is a block diagram of a user's determined event information for a twenty-four hour period, according to an implementation.

FIG. 10 is a block diagram of determined wireless device connection pattern exceptions identified based on a device's determined standard connection pattern and a user's determined event information for a twenty-four hour period, according to an implementation.

FIG. 11 is a block diagram of a device's planned anticipated connection pattern for a twenty-four hour period, according to an implementation.

Figure 1:
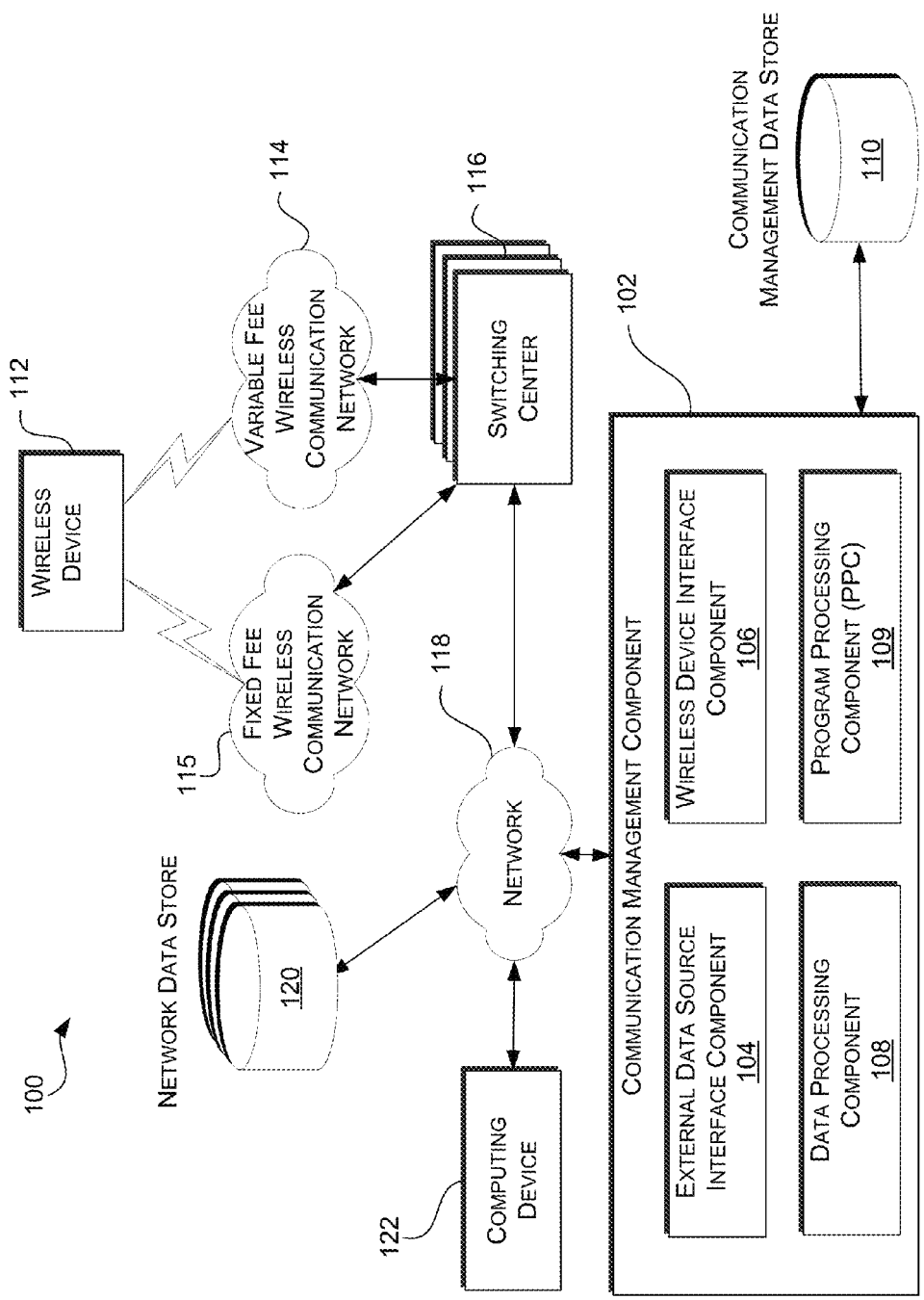
FIG. 1 is a block diagram illustrative of a wireless device communication environment for use in anticipating data use, anticipating wireless device connection events and transmitting a set of data during an occurrence of an anticipated connection event.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Generally described, aspects of the present disclosure relate to the management of data delivery to devices. Specifically, aspects of the present disclosure relate to the management and delivery of a set of data to wireless devices during connection events with fixed fee wireless networks so the data is on the device and available to the user when requested. For example, it may be determined that a user reads political news from a news reader program on the user's wireless device every day between 08:00-09:00 during a commute to work (anticipated data use). It may also be determined that the wireless device is usually connected to a fixed fee wireless network (e.g., user's home WLAN) between 00:00-07:00 (anticipated fixed fee wireless network connection event) and a variable fee wireless network (Operators WAN) between 08:00-10:00 (variable fee wireless network connection event). Based on the wireless device connection event patterns and anticipated data use, rather than delivering the data for the news program during an occurrence of a variable fee wireless network connection event, the systems described herein identifies the patterns and, anticipating the data use, delivers the anticipated data in advance during a fixed fee wireless network connection event. By determining and anticipating wireless device connection events and anticipating data use, data can be delivered in advance and available to the user so that the user does not experience charges or other fees to obtain the data over a variable fee wireless network.

Anticipated connection events are determined by data processing components on a wireless device or on a network-based communication management system as a function of collected wireless device information and/or collected user event information. As used herein, the information utilized by a data processing component in the determination and anticipation of wireless device connection events will be collectively referred to as "wireless device information and user event information." However, reference to "wireless device information and user event information" should not be construed to imply any limitation as to any singular wireless device information, any singular user event information, or any combination of wireless device information and/or user event information. Additionally, reference to "wireless device information and user event information" will not necessarily be limited to particular types of wireless device information or user event information or to the illustrative examples of wireless device information and/or user event information described in the present disclosure.

In one implementation, wireless devices collect wireless device information that can include performance metrics of the wireless device, such as power supply levels, power consumption rates, wireless communication network signal strength, wireless network connection type (fixed fee or variable fee), whether the wireless network is secure (e.g., home WLAN or public WLAN), wireless device use or activity, geographic locations of the wireless device, ambient temperature, and the like. In another illustrative embodiment, wireless devices collect wireless device information and user event information that can include user interactions with the wireless device, such as powering down the wireless device, accessing programs on the wireless device, enabling/disabling WAN radio communication functionality, enabling/disabling WLAN radio communication functionality, placing the wireless device in a limited communication mode, plugging the device in for charging, placing the device in a pocket or bag, and the like. In still a further implementation, wireless devices also collect, or are otherwise associated with, user event information that can include additional information associated with an identified user, such as user profile information, user preference information, user calendaring information, user tasks information, and the like. The collected wireless device information and user event information can be processed and used to identify anticipated wireless device connection events and/or unavailability of the wireless device (also referred to herein as a connection event).

In an implementation, the wireless devices can include a data processing component that processes the wireless device information and user event information to determine connection events with fixed fee wireless networks, variable fee wireless networks, and/or unavailability of the wireless device. Additionally, a communication management system can provide a network-based data processing component for processing the wireless device information and user event information to determine anticipated connection events. The network-based data processing component may work in conjunction with the data processing component of the wireless device or as an alternative to the data processing component of the wireless device.

In either case, the data processing components can utilize connection event processing criteria that establish, or are used to establish, anticipated connection events with fixed fee wireless networks, variable fee wireless networks, and/or unavailability. For example, the data processing components can maintain historical wireless device connection event information that can be used to identify and anticipate future wireless device connection events and develop wireless device connection patterns. In another example, the data processing components can utilize defined geographic location or geospatial area processing criteria that identify areas of anticipated wireless device connection events in combination with other wireless device or user event information. In a further example, the data processing components can develop and maintain wireless device connection patterns of previous connection events and the wireless device information and user event information that facilitated such a connection pattern, including a sequence of wireless device information and user event information. The data processing components can then utilize the connection patterns in making future determinations of connection events by matching collected wireless device information and user event information with the wireless device information and user information from the connection event patterns.

Similar to anticipated connection events, the anticipated data use may also be determined by data processing components on a wireless device and/or on a network-based communication management system as a function of collected program usage information and/or program consumption information. As used herein, the information utilized by a data processing component in the determination of anticipated data use will be collectively referred to as "program usage information and/or program consumption information." However, reference to "program usage information and/or program consumption information" should not be construed to imply any limitation as to any singular usage of programs, program usage information or program consumption information, or any combination of programs, program usage information or program consumption information. Additionally, reference to "program usage information and/or program consumption information" will not necessarily be limited to particular types of programs, particular types of program usage information, particular types of program consumption information or to the illustrative examples of program usage information and/or program consumption information in the present disclosure.

In one implementation, wireless devices collect program usage information that can include an identification of the programs accessed, the time at which they were accessed, the duration of access, and the like. In another illustrative embodiment, wireless devices collect program consumption information that can include an identification of the data stored and used by the programs, the anticipated data stored and available to the programs, the data consumed by the user of the programs, the position in the data consumed by the user of the program, and the like.

As previously described, in an implementation, the wireless device can include a data processing component that processes the program usage information and/or the program consumption information to anticipate data use and determine data that is potentially of interest to a user (anticipated data). Additionally, a communication management system can provide a network-based data processing component for processing the program usage information and/or program consumption information to determine anticipated data use. The network-based data processing component may work in conjunction with the data processing component of the wireless device or as an alternative to the data processing component of the wireless device.

In either case, the data processing components can utilize data criteria that is established, or are used to establish, anticipated data use by each program. For example, the data processing components can maintain or access relationships between data already stored and/or consumed (in whole or in part) through a program on the wireless device and identify related data that will likely be consumed in the future by a user of the program (anticipated data). In another example, the program may be a progressive game and the data processing components may determine that a user has almost completed a current level and identify data for the next level of the game as anticipated data. In still another example, the program may be an electronic book ("e-book") reader application and the data processing components may determine that the user has almost completed reading a book and use data criteria to identify a likely next book as thus identify anticipated data.

Based on planned connection events, the data processing component can plan in advance the delivery of anticipated data during a fixed fee wireless network connection event to ensure the data is available to the program and/or wireless device when accessed by the user without the user having to incur the cost of transmitting the anticipated data over a variable fee wireless network. Anticipated data may include data that is likely to be consumed by the user, scheduled to be transferred, or any other data that may be delivered or transferred to or from the wireless device. In an illustrative embodiment, the anticipated data can include, but is not limited to, data to be generated on the wireless device (e.g., electronic publications), data to be used by one or more programs on the wireless device, software application downloads or software application updates to be executed or stored on the wireless device, multi-media data, and the like.

By way of an illustrative example, assume a user has a wireless device, such as a smart phone, that can receive data from various data providing entities over either a variable fee wireless network or a fixed fee wireless network. In this example, a data providing entity, such as a data publisher or data providing service, may attempt to transmit electronic books to the electronic book reader device upon receipt of a user request/order, or as soon as the data becomes available. Additionally, the data providing entity can also schedule the delivery of a subset of data, such as periodicals, web logs, or data updates based upon a specific time of day or upon completion of a triggering event (e.g., the close of the stock market trading day). However, if the data processing component anticipates that the wireless device will be only connected over a variable fee wireless network, or not be connected at all (i.e., unavailable) when the user is likely to request the data, or at a scheduled time, the data processing component may plan and initiate the transmission and exchange of the anticipated data during a prior connection event when the device is communicating over a fixed fee wireless network. More specifically, the data processing component utilizes wireless device information, event information and program usage and consumption information to determine anticipated connection events and plan delivery of anticipated data during connection events that occur over fixed wireless networks and before the anticipated data use. Upon the occurrence of an anticipated fixed fee wireless network connection event, a communication management system component and the wireless device exchange data or information without action by the user. The practical impact to the wireless device user is that the data is exchanged prior to the anticipated data use over a fixed fee wireless network so that the user does not incur a charge or fee for transferring the data.

In one example, the data processing component may develop a wireless device connection pattern identifying that a user's wireless device is typically charging and connected to a fixed fee wireless network during the early morning between 01:00-05:00 but operating on battery and only connected to a variable fee wireless network during the user's daily commute between home and work from 07:00-09:00. The determination of such a connection pattern can be made by the data processing component using wireless device information and/or user event information such as proximity of the wireless device to the user's home, the connection type typically maintained by the wireless device during recurring time-periods, and the like. Based off the connection pattern, a fixed wireless network connection event is anticipated and a variable fee wireless network connection event is anticipated.

Data needed for the anticipated data use that will likely occur during the anticipated variable fee wireless network connection event is scheduled and delivered to the wireless device in advance during the fixed fee connection event so that it is available to the user and the user does not incur a data delivery charge to obtain the data.

In another example, the data processing component may have developed a standard connection pattern indicating that the user is typically connected to a WLAN in the evenings but also identify a user event indicating that the user has plans to board an eight hour flight to Tokyo in the afternoon. The determination of such a user event can be made by the data processing component using wireless device information and user event information such as proximity of the wireless device to an airport, polled user calendaring and profile information, and/or other wireless device or user event information. In a more specific example, the data processing component may identify a calendar entry for the planned trip along with an email confirmation of the flight information indicative of the potential that the user will be traveling. In addition to determining an anticipated connection event in which the device is unavailable during the flight, the data processing component also anticipates that during the time required to travel to the airport, the wireless device will likely be connected via a variable fee wireless network and likely connected via a fixed fee wireless network while the user is at the airport but prior to departing. In addition to anticipating the various connection events, the data the user will likely access while in route to the airport and desire to access during the flight is determined (anticipated data use) and plans are made to deliver that data earlier in the day during an anticipated fixed fee wireless network connection event. In one implementation, such a determination and planning is made by the data processing component and the data needed for the data use is exchanged with the wireless device during a fixed fee wireless device connection event without any additional involvement or activities by the user. Accordingly, the anticipated data will be transferred to the wireless device prior to an anticipated variable fee network connection event and before the anticipated unavailability connection event so that it will be available to the user of the wireless device during the airline flight and delivered without the user incurring a charge to obtain the data over a variable fee wireless network.

In another example, a user may also plan to or normally have a variable fee network connection during a scheduled meeting such that the wireless device will not be able to receive data via a fixed fee wireless network connection during the meeting. In this example, the data processing component may determine that the user will likely access data related to an upcoming meeting with a financial team during that meeting. Responding to the anticipated variable fee wireless network connection event and determining the data that will likely be accessed, prior to that variable fee wireless network connection event and during the occurrence of a fixed fee wireless network connection event, the wireless device can exchange information during the fixed fee wireless network connection event to transmit any data (e.g., user defined meeting agenda), receive scheduled data (e.g., the most up-to-date financial information), and/or receive additional data (e.g., any information corresponding to keywords associated with the upcoming meeting).

As described in the above example, the determination of such connection events can be made by the data processing component using wireless device information and user event information, such as polled user calendaring and profile information, to identify the specific meeting (e.g., by extracting subject headings from the calendar event data). Additionally, to identify anticipated data use that will be accessed during a variable fee wireless network connection event, the data processing component can further utilize the extracted subject matter headings from the calendar event data to initiate a search for the relevant data. Still further, the data processing component can utilize past user data requests stored in a user profile to identify the most relevant data to transmit to the wireless device. Thus, the anticipated data will be transferred to the wireless device during a fixed fee wireless network connection event so that it is available to the user of the wireless device during the meeting and without the user having to incur a cost to obtain the data over a variable fee wireless network.

Although aspects of the present disclosure will be described with regard to an illustrative wireless communication device environment and component interactions, wireless communication protocols and flow diagrams, one skilled in the relevant art will appreciate that the disclosed implementations are illustrative in nature and should not be construed as limiting. Specifically, although the term wireless device is used in this document, the term represents any type of device having a component for communicating with one or more other devices via one or more communication paths. Such communication paths can include wireless communication paths (via infra-red, RF, optical, terrestrial, or satellite communication media) and wired communication paths. Likewise, while the examples discussed herein focus on planning and performing data exchange using fixed fee wireless networks and variable fee wireless networks, the implementations described herein are equally applicable for wired networks (fixed fee wired networks and/or variable fee wired networks) or a combination of wired and wireless networks.

With reference now to FIG. 1, a block diagram illustrative of a wireless device management environment 100 for managing wireless device communications will be described. As illustrated in FIG. 1, the communication management system 102 can include an external data source interface component 104 for obtaining external information from network-based resources, such as information corresponding to a user associated with the wireless device. The communication management system 102 can also include a wireless device interface component 106 for obtaining wireless device information and user event information from a variety of wireless devices. The communication management system 102 can further include a data processing component 108 for processing the wireless device information and user event information, and/or additional information to determine connection events based on determined connection patterns for the wireless device to exchange information via one of the wireless communication networks 114, 115. The communication management system 102 can also include a program processing component 109 for processing the program usage information and the program consumption information and/or additional information to determine data that will likely be accessed by a user of the programs (anticipated data). The communication management system 102 can further be associated with a communication management data store 110 for storing information obtained by the interface components 104, 106 and/or utilized by the data processing component 108 and/or the program processing component 109, as will be explained in greater detail below.

One skilled in the relevant art will appreciate that the communication management system 102 may correspond to a number of computer devices, such as server computing devices. Additionally, the external data source interface component 104, wireless device interface component 106, data processing component 108 and/or the program processing component 109 may be implemented in a single computing device or across multiple computing devices. Likewise, although the communication management data store 110 is illustrated as local to the communication management system 102, the data store 110 can correspond to a distributed data store and/or network-based data store. One skilled in the relevant art will also appreciate that the communication management system 102 may include any one of a number of additional hardware and software components that would be utilized in the illustrative computerized network environment to carry out the illustrative functions of the system 102 and/or any of the individually identified components.

With continued reference to FIG. 1, the wireless device management environment 100 can include any number of wireless devices 112. The wireless devices 112 can correspond to a wide variety of devices or components that are capable of initiating, receiving or facilitating communications over a communication network including, but not limited to, personal computing devices, electronic book readers (e.g., e-book readers), hand held computing devices, integrated components for inclusion in computing devices, home electronics, appliances, vehicles, machinery, mobile telephones, modems, personal digital assistants, laptop computers, gaming devices, and the like. In an illustrative embodiment, the wireless devices 112 include a wide variety of software and hardware components for establishing communications over one or more communication networks, including WAN communication network 114, WLAN communication network 115 or a wired communication network (not shown). Illustrative components of a wireless device 112 will be described in greater detail with regard to FIG. 2.

In an illustrative embodiment, the wireless device management environment 100 can include a number of additional components, systems and/or subsystems for facilitating communications with the wireless devices 112 and/or the communication management system 102. The additional components can include one or more mobile switching centers 116 for establishing communications with the wireless devices 112 via a variable fee wireless network 114 and/or a fixed fee wireless network 115. The variable fee wireless network and/or the fixed fee wireless network may be any form of wireless communication network. For example, either or both of the variable fee wireless network 114 and the fixed fee wireless network 115 may be based on a WAN or based on WLAN, such as the family of IEEE 802.11 technical standards ("WiFi"), a wireless network based on IEEE 802.16 standards ("WiMax"), and other wireless networks. As illustrated in FIG. 1, the mobile switching center 116 includes interfaces for establishing various communications via a communication network 118, such as the Internet, intranets, private networks and point to point networks, generally referred to as the "network."

The wireless device management environment 100 can further include one or more network data source components 120 for providing external information corresponding to aspects of the wireless devices 112. The network data source components 120 may include a number of computing devices for obtaining and processing requests for information from either the communication management system 102 and/or the wireless devices 112. Additionally, wireless device management environment 100 can further include a number of computing devices 122 for transmitting information via the communication network 118 to the communication management system 102 and/or the wireless devices 112. In an illustrative embodiment, the computing devices 122 can include various hardware and/or software components, such as a browser software application or another software application, for configuring, monitoring, or maintaining anticipated wireless device communication events, wireless device connection patterns and information.

Figure 2:
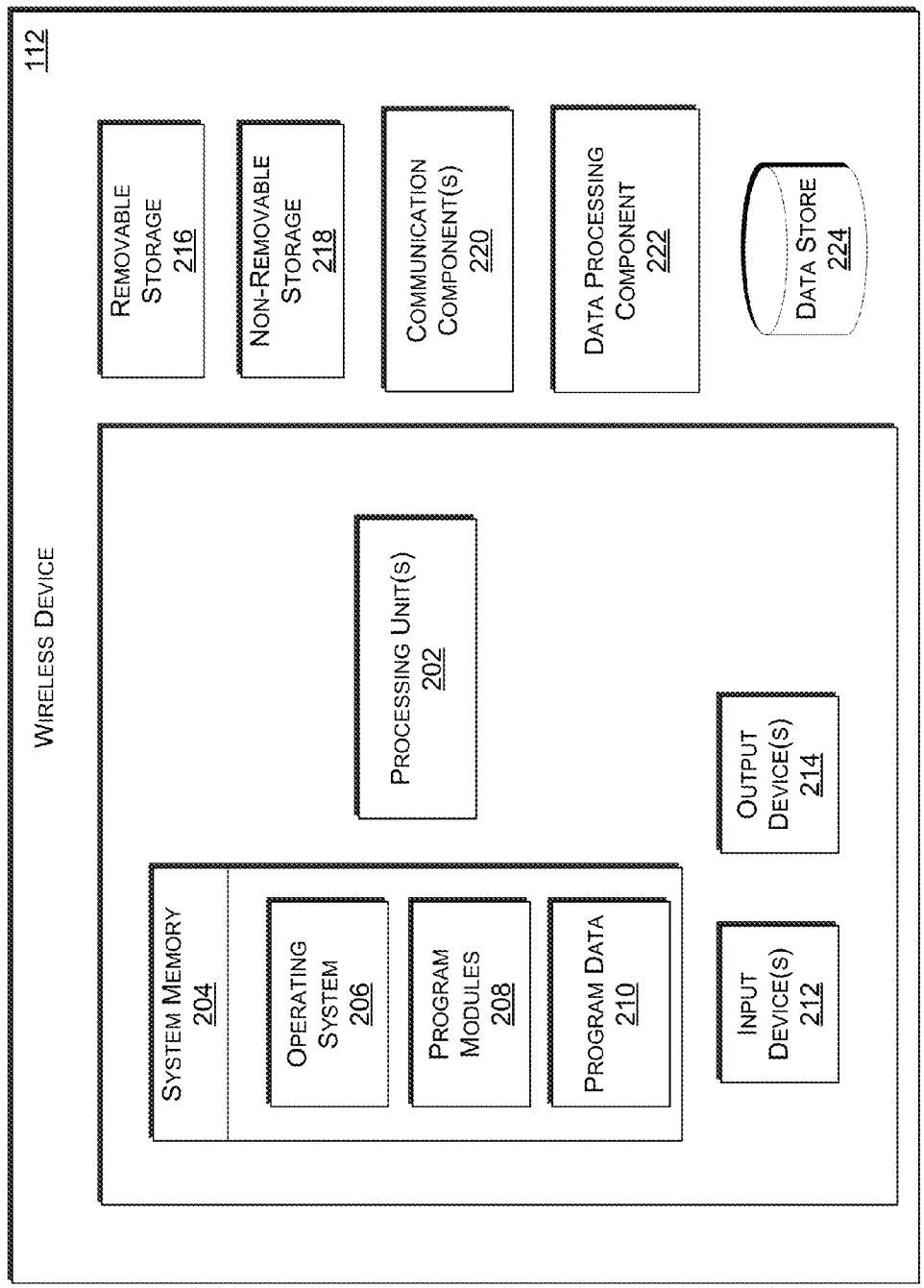
FIG. 2 is a block diagram illustrative of components of a wireless device for use in anticipating data use, anticipating wireless device connection events and transmitting a set of data during an occurrence of an anticipated connection event.

With reference now to FIG. 2, illustrative components of a wireless device 112 for use in determining anticipated wireless device connection patterns, planning data exchange and transmitting a set of data based on anticipated connection events will be described. The wireless device 112 may include one or more processing units 202, such as one or more CPUs. The wireless device 112 may also include system memory 204, which may correspond to any combination of volatile and/or non-volatile storage mechanisms. The system memory 204 may store information which provides an operating system component 206, various program modules 208, program data 210, and/or other components. The wireless device 112 performs functions by using the processing unit(s) 202 to execute instructions provided by the system memory 204. The wireless device 112 may also include one or more input devices 212 (keyboard, mouse device, specialized selection keys, microphone, touch based display, etc.) and one or more output devices 214 (displays, printers, audio output mechanisms, etc.).

With continued reference to FIG. 2, the wireless device 112 may also include one or more types of removable storage 216 and one or more types of non-removable storage 218. Still further, the wireless device 112 can include communication components 220 for facilitating communication via wired and wireless networks, such as the variable fee wireless network 114, the fixed fee wireless network 115 and network 118 (FIG. 1). As will be explained in greater detail below, the wireless device 112 can also include a communication management component 222 and associated data store 224. The communication management component 222 may process wireless device information, user event information, program usage information and/or program consumption information and determine anticipated connection events based on determined connection patterns. Based on the determined anticipated connection events, the communication management component 222 may also plan the exchange of data via a fixed fee wireless network during an anticipated fixed fee wireless network connection event. The data store 224 may store such information. The communication management component 222 may further be operative to generate requests to the communication management system 102 (FIG. 1) for a set of data during an anticipated connection event. The above-enumerated list of modules is representative and is not exhaustive of the types of functions performed, or modules implemented, by the wireless device 112. One skilled in the relevant art will appreciate that additional or alternative components may also be included in the wireless device 112 to carry out other intended functions such as for an electronic book reader, mobile telephone or tablet computing device.

Figure 3:
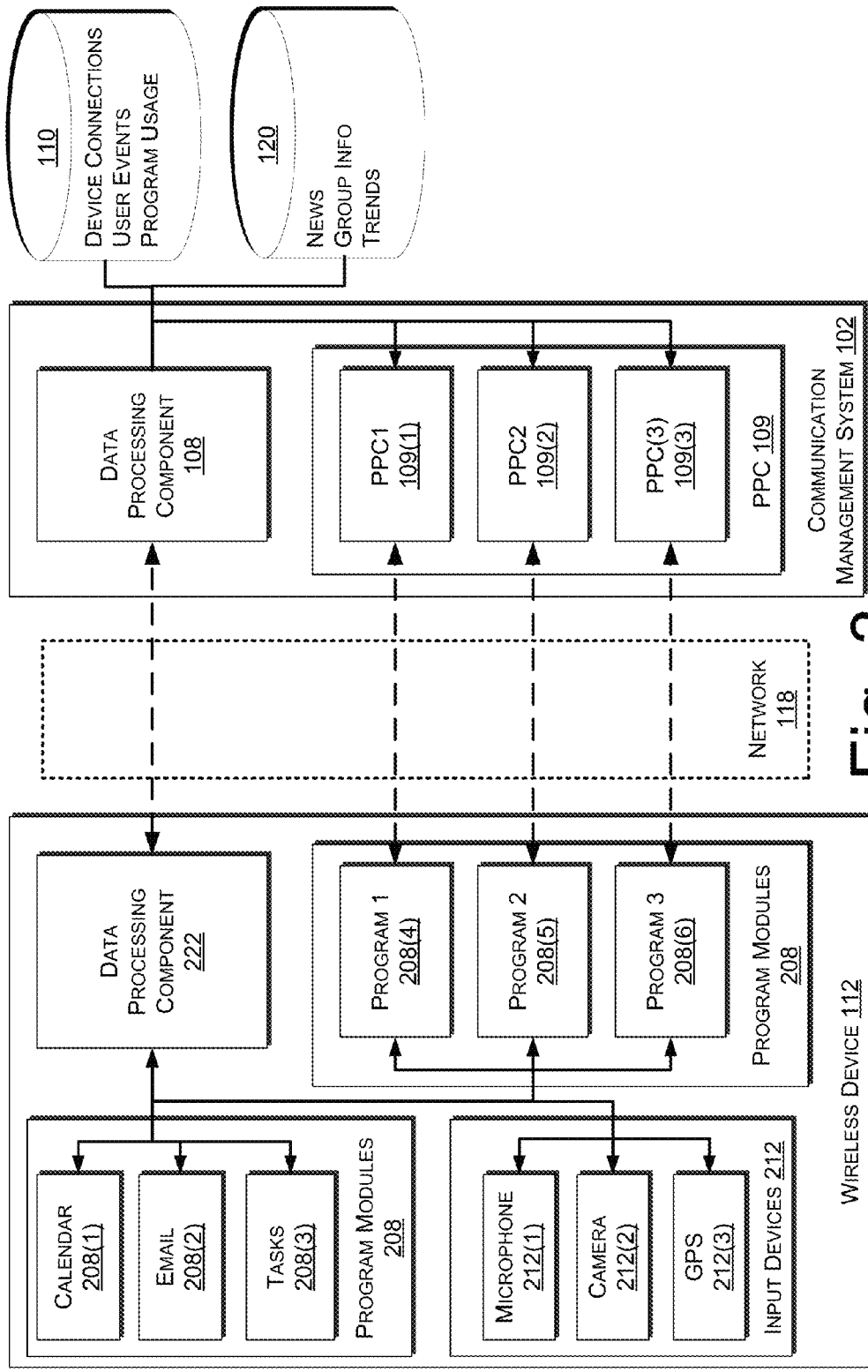
FIG. 3 is a block diagram illustrative of components of a wireless device and a communication management system for use in anticipating data use, anticipating wireless device connection events and transmitting a set of data during an occurrence of an anticipated connection event.

FIG. 3 is a block diagram of a more detailed view of portions of a wireless device 112, the communication management system 102 and accompanying data stores 110, 120. As discussed above, the wireless device and the communication management system 102 exchange information over a network 118, such as device connection information, user event information, program usage information, and/or program consumption information, to determine wireless device 112 connection patterns and anticipated data use and to plan delivery of anticipated data during a fixed fee wireless network connection event. In some implementations, the data processing components 222, 108 may exchange wireless device information and user event information while various program modules 208, such as program module 1 208(4), program module 2 208(5) and program module 3 208(6)

exchange program usage information and/or program consumption information with respective program processing modules 109, such as program processing module 1 109(1), program processing module 2 109(2) and program processing module 3 109(3).

In such a distributed environment, the data processing components 108, 202 may determine wireless device connection patterns and plan delivery of anticipated data during the occurrence of one or more anticipated fixed fee wireless network connection events. For example, the data processing component 222 may obtain user information from some user centric program modules 208, such as a calendar program module 208(1), an e-mail program module 208(2), a task program module 208(3), and/or any other types of program modules 208 and provide that data to the data processing component 108 of the communication management system 102. Likewise, the data processing component 222 may collect and provide wireless device connection information, such as the type of wireless network to which the wireless device 112 is connected, the duration of the connection, when the device is in an active or idle state, whether the device is operating on battery or connected power, the location of the device, and the like.

The data processing component 108 of the communication management system 102 may receive the wireless device information and user event information in conjunction with external information, such as that obtained from the network data store 102 to determine wireless device connection patterns for predetermined periods of time (e.g., twenty-four hours). Additional details are provided below with respect to FIGS. 7-11 for determining wireless device connection patterns, according to some implementations.

The program processing components 109 of the communication management system 102 may receive program usage information and/or program consumption information from the program modules 208 of the wireless device 112 and use that information in conjunction with external information to determine anticipated data that will likely be accessed by the user when using that program. For example, program module 1 208(4) may be a newsfeed program and provide the program processing component 1 109(1) with information identifying that the user of the wireless device 112 typically requests political news when accessing the newsfeed program. The program processing component 1 109(1) may receive that information from the program module 1 208(4) and in conjunction with external information, such as news information obtained from the network data store 120, may identify news articles that will likely be accessed by the user of the wireless device 112 during the next access of the program module 1 208(4). This collection of information and identification of the most likely data to be accessed by each program module 208 may be done by the respective program processing components 109 of the communication management system 102. Upon identification, each program processing component 109(1)-109(3) may identify to the data processing component 108 the data that it views as most likely to be accessed by the user of the wireless device 112. The data processing component 108, upon receiving information from the program processing components 109, in conjunction with information received from the data processing component 222, information stored in the communication management data store 110 and/or information stored in the external network data store 120, may prioritize the anticipated data into one or more sets of data and plan delivery of those sets of data to be delivered to the wireless device 112 during one or more anticipated fixed fee wireless network connection events. Prioritizing and planning delivery of anticipated data to a wireless device 112 is discussed in further detail below with respect to FIGS. 12-13.

Still further, the data processing component 108 of the communication management system 102 may provide to the data processing component 222 of the wireless device 112 determined connection patterns for periods of time. Alternatively, the data processing component 222 may independently determine wireless device connection patterns based on wireless device information collected by the data processing component 222.

Regardless, based on the determined wireless device connection patterns, upon identification of an occurrence of an anticipated wireless device connection event, the data processing component 222 of the wireless device 112 may notify the data processing component 108 of the occurrence of the anticipated connection event and the communication management system 102 may coordinate to exchange the set of data planned for delivery during the anticipated connection event that is occurring. Further details with regard to delivery of data during an occurrence of an anticipated connection event are described below with respect to FIGS. 14 and 15.

Figure 4:
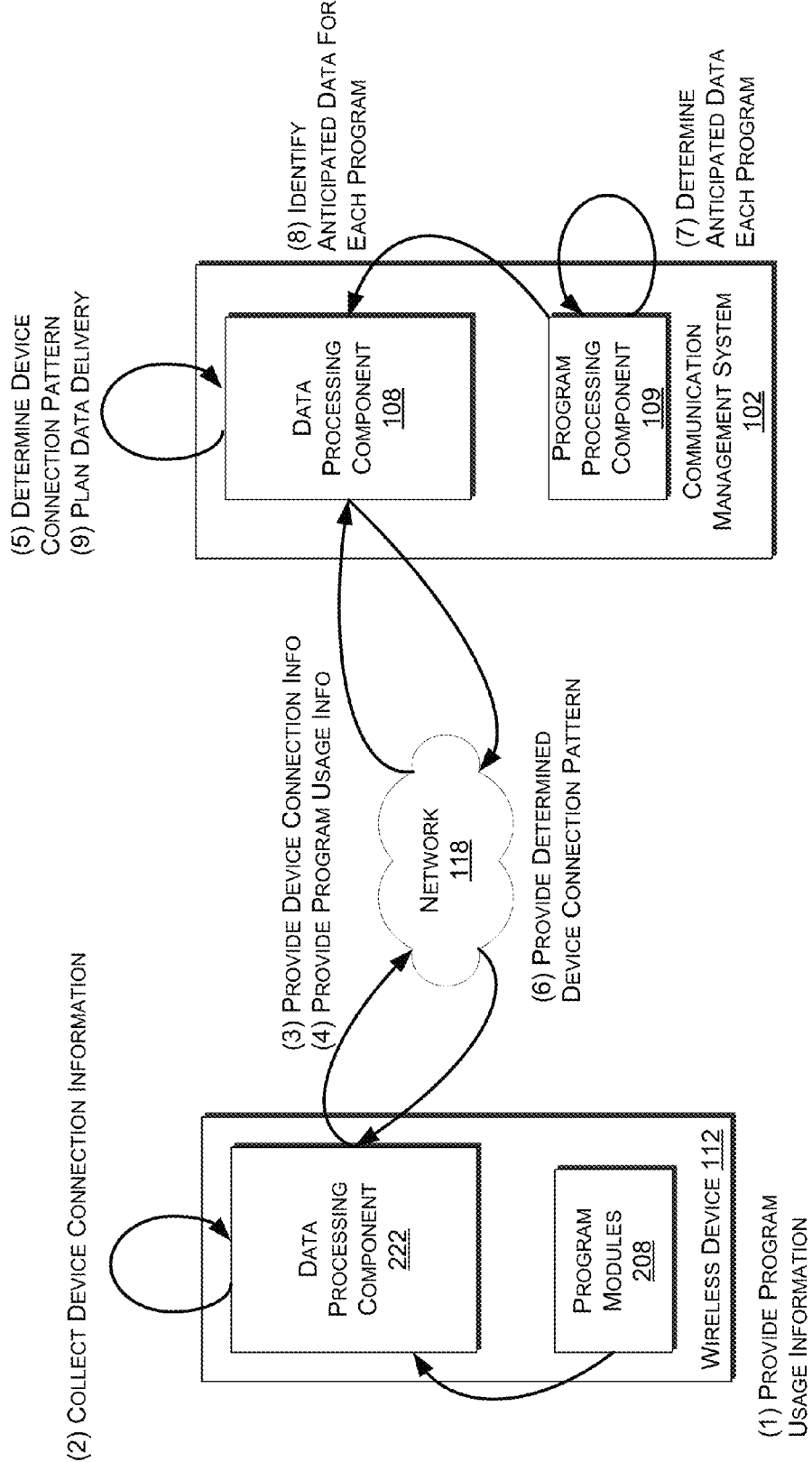
FIGS. 4-6 are block diagrams of the wireless device communication environment of FIG. 1 illustrating various implementations for the collection and processing of wireless device information and program usage information to anticipate wireless device connection events, to plan delivery of data during an anticipated connection event and to transmit a set of data during the occurrence of an anticipated connection event.
Figure 5:
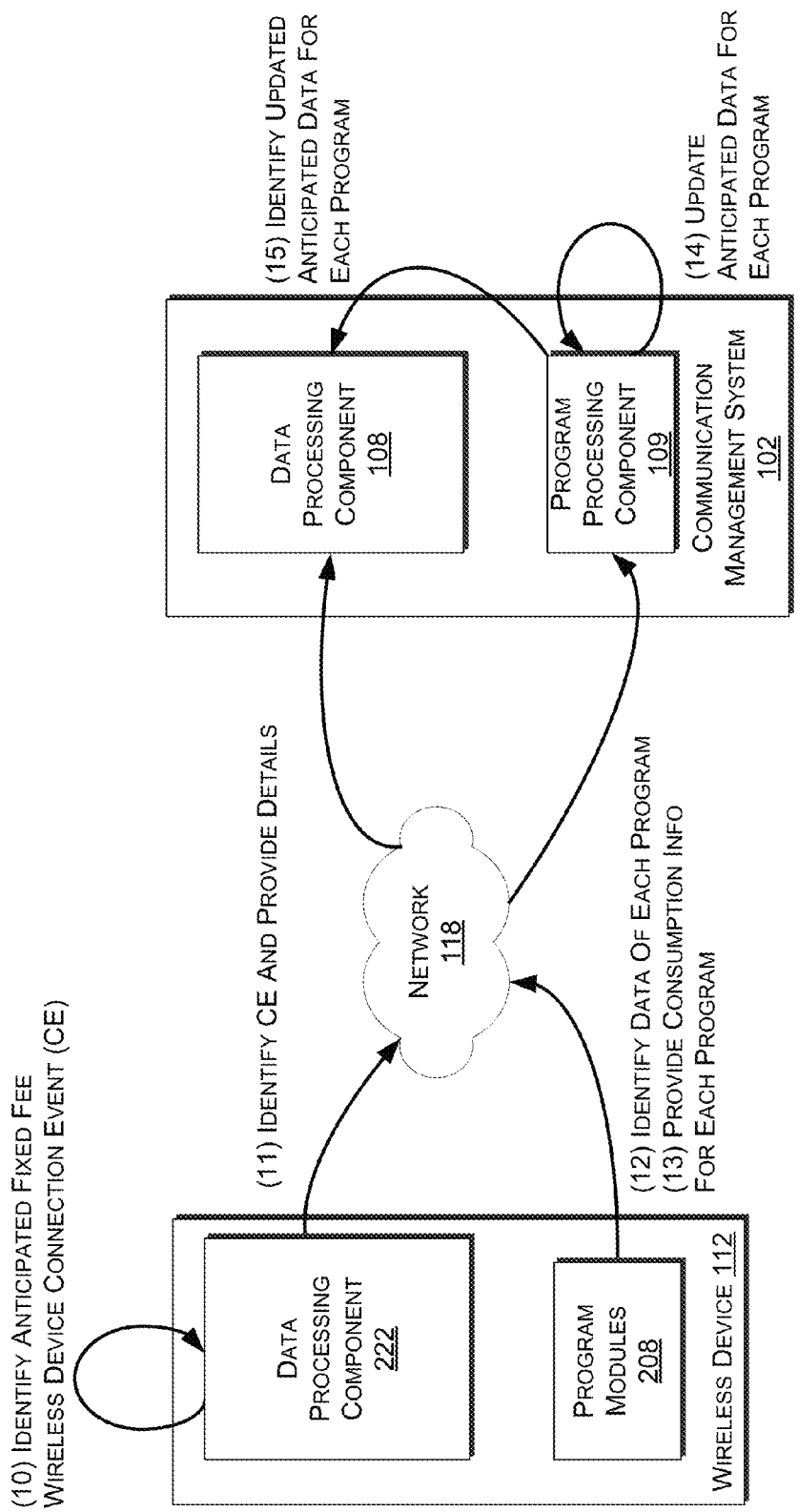
Figure 6:
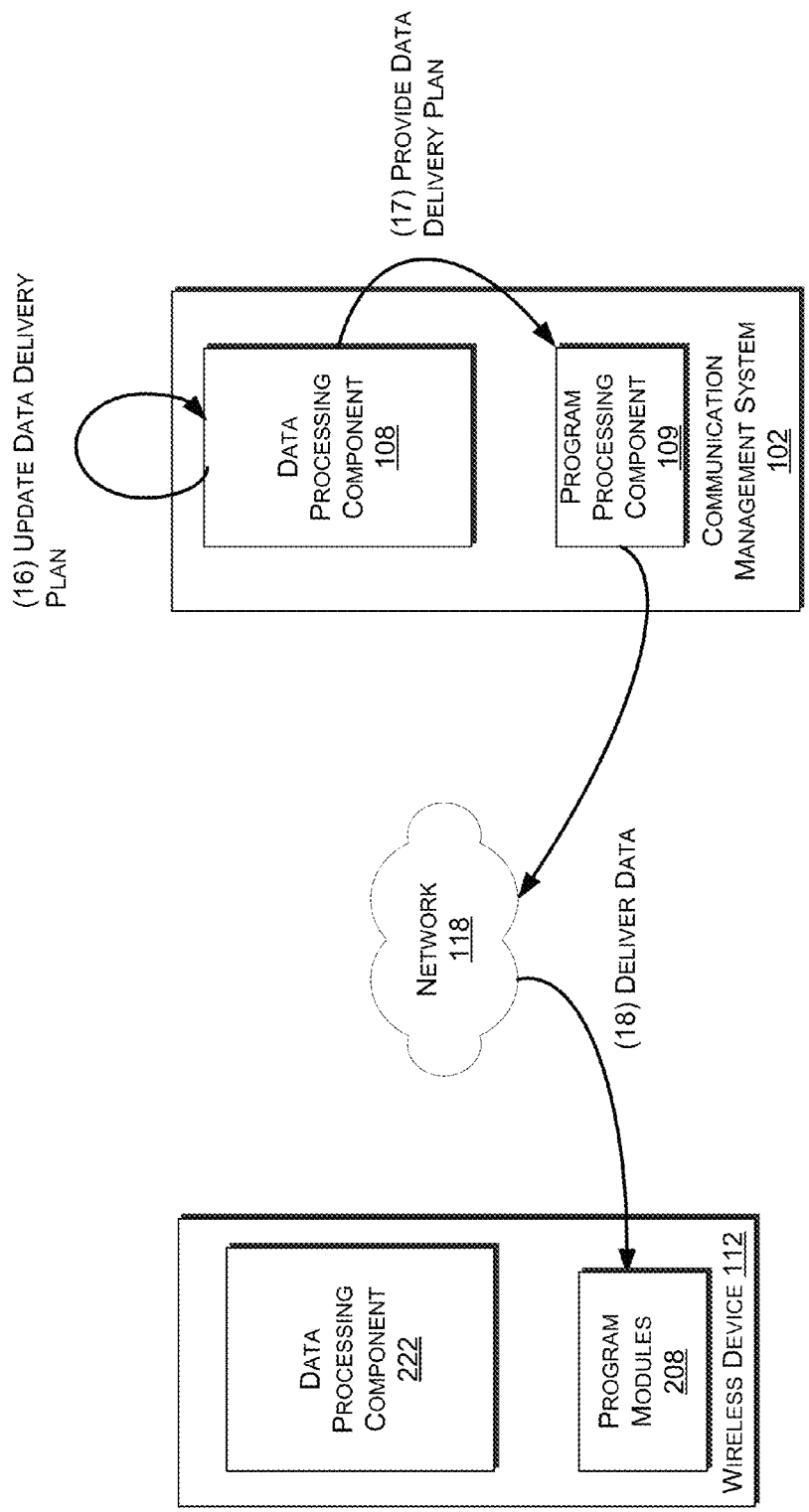

With reference now to FIGS. 4-6, the interaction between the various components of the wireless device management environment 100 (FIG. 1) will be described. With reference to FIG. 4, in one implementation, the program modules 208 of the wireless device 112 provide program usage information to the data processing component 222 of the wireless device 112. The data processing component 222 or another component of the wireless device 112 receives or otherwise obtains the program usage information, collects wireless device information and user event information and provides that information over the network 118 to the data processing component 108 of the communication management system 102. As previously described, program usage information can include a variety of information such as, but not limited to, the program modules accessed, the data accessed within each program module, the time at which each program module was accessed, the duration of time each program module was accessed, and the like. Examples of program module usage information include, but are not limited to e-mail program access time, e-mails viewed, identification of data associated with emails, news article types accessed, the time and/or location during which a program module is accessed, and the like.

Also, as previously discussed, the wireless device information and user event information can correspond to a variety of information including, but not limited to, wireless device performance metrics, wireless device location information, wireless device network connection information, and the like. The wireless device information and user event information can also correspond to user interaction information associated with commands/controls initiated or manipulated by a user, whether the device is in an active or idle state, whether the device is charging or operating on battery power, etc. Examples of user interaction include, but are not limited to, use of the device, unplugging the device, disabling a communication component, such as a wireless modem, etc., selecting a limited communication mode on the wireless device, and the like. The wireless device information and user event information can also include additional external information, such as user profile or preference information, user calendaring information, task information, and the like.

Based on the wireless device information and user event information, the communication management system 102, through the data processing component 108, determines a wireless device connection pattern for a predetermined period of time (e.g., twenty-four hours) that includes a series of anticipated device connection events that identify whether the device will likely be connected to a fixed fee wireless network, a variable fee wireless network, or unavailable. For example, the communication management component 108 may determine, based on wireless device connection information received and analyzed over a period of time, a standard wireless device connection pattern for a period of time. Comparing that with user event information, potential connection event exceptions may be determined that identify when the device may not be following the standard wireless device connection pattern. By combining the standard wireless device connection patterns and any identified exceptions, a device connection pattern may be determined that includes a series of anticipated connection events occurring during a period of time. In some implementations, a degree of probability or certainty may be assigned to each anticipated connection event identifying the likelihood that the anticipated connection event will occur.

The determined device connection pattern may then be returned to the wireless device 112 to enable the wireless device 112, via the data processing component 222, to monitor for anticipated connection events identified in the determined wireless device connection pattern. As discussed above, in an alternative implementation, the data processing component 222 of the wireless device 112 may independently or in conjunction with the data processing component 108 of the communication management system 102 determine wireless device connection patterns and/or identify anticipated wireless device connection events.

Also, as illustrated in FIG. 4, the program processing component 109 of the communication management system 102 may determine anticipated data use for each of the various program modules 208 of the wireless device 112. For example, if there are twelve different program modules within the wireless device 112 that a user of the wireless device frequently accesses, the respective program processing component 109 of the communication management system 102 may obtain information, such as program usage information and/or program consumption information, about those program modules 208 and determine for each the most likely data that will be requested (anticipated data). In some implementations, each respective program processing component 109 may identify the most likely item of data to be accessed by each program module 208 independent of other program modules. An identification of the anticipated data may then be provided to the data processing component 108 of the communication management system 102.

Upon receiving the identification of anticipated data and the program usage information, the data processing component 108 of the communication management system 102 may develop a data delivery plan such that the anticipated data that is most likely to be accessed by the user during an anticipated variable fee wireless network connection event is planned for delivery such that it will be delivered to the wireless device 112 during a fixed fee wireless connection event that occurs before the anticipated data use. For example, if the newsreader program processing component associated with the respective newsreader program module identifies anticipated data as political news, and the program usage information provided by the data processing component 222 identifies that the user of the wireless device 112 typically accesses the newsreader program module between 09:00-10:00, the data processing component 108 may plan delivery of the anticipated data such that it will be delivered to the device during a fixed fee wireless network connection event that occurs before 09:00. In this example, the determined device connection patterns may identify an anticipated fixed fee wireless network connection event that occurs between 05:00 and 07:00. In such an instance, the data processing component 108 may develop a data delivery plan that plans for delivery of the anticipated data —news information—to occur during the fixed fee wireless network connection event that is anticipated to occur between 05:00 and 07:00. The data delivery plan may continue to be developed for each anticipated data identified by the respective program processing components 109 based on the anticipated data use.

Turning now to FIG. 5, at some point during operation, the wireless device 112 may identify the occurrence of an anticipated fixed fee wireless device connection event and notify the data processing component 108 of the communication management system 102 of the anticipated connection event occurrence. In some implementations, additional information about the wireless device 112 and/or the connection event may also be provided. For example, the wireless device 112 may provide information to the communication management system 102 identifying whether the device is in an active state, an idle state, stationary, operating on battery power, charging, device location, etc.

In addition to identifying the occurrence of the connection event and optionally providing additional details, the wireless device 112, via the program modules 208, may identify the specific data stored and/or accessed by each of the program modules 208 and identify any anticipated data that has been delivered to the device but not yet accessed. In addition, the program modules 208 may provide an update as to the consumption information for each program. As discussed above, consumption information may include identification of the information consumed by the user when accessing the program module, such as how far they have read in a book, or how far they have progressed.

Upon receiving identification of the connection event, the communication management system updates data information for each program module and/or consumption information for each program module and may update the previously determined data delivery plan to ensure that it corresponds with the data available and/or consumed by the program modules on the wireless device. For example, referring again to the news program module, upon the occurrence of a connection event, the news program module may identify to the respective program processing component 109 that the political morning news that had been delivered and stored on the wireless device 112 during a prior fixed fee wireless network connection event has not been accessed by the user of the wireless device 112 and is no longer available for access (e.g., it was overwritten to make room for other information). Upon receiving this information, the respective news program processing component may update the list of anticipated data to include the political morning news information as the most anticipated data to be accessed by the user via the news program module. The updated anticipated data is provided by the respective program processing modules 109 to the data processing component 108 of the communication management system 102.

Turning now to FIG. 6, upon receiving the updated anticipated data list from each of the respective program processing components 109, the data processing component 108 makes any adjustments to the data delivery plan and provides data delivery instructions to each of the respective program processing components 109. For example, even though the program processing component 109 associated with the news program module has identified the morning political news as anticipated data that is needed on the wireless device 112, the data processing component 108 may determine, based on the user's program usage information, that it is more likely the user will access sports scores from the previous night's games before accessing the political news program module and accordingly plan delivery of the sports scores before delivery of the morning political news.

Upon receiving the data delivery schedule, the respective program processing components 109 of the communication management system 102 delivers the identified data to respective program modules 208 of the wireless device 112 during the occurrence of the fixed fee wireless device network connection event.

Figure 7:
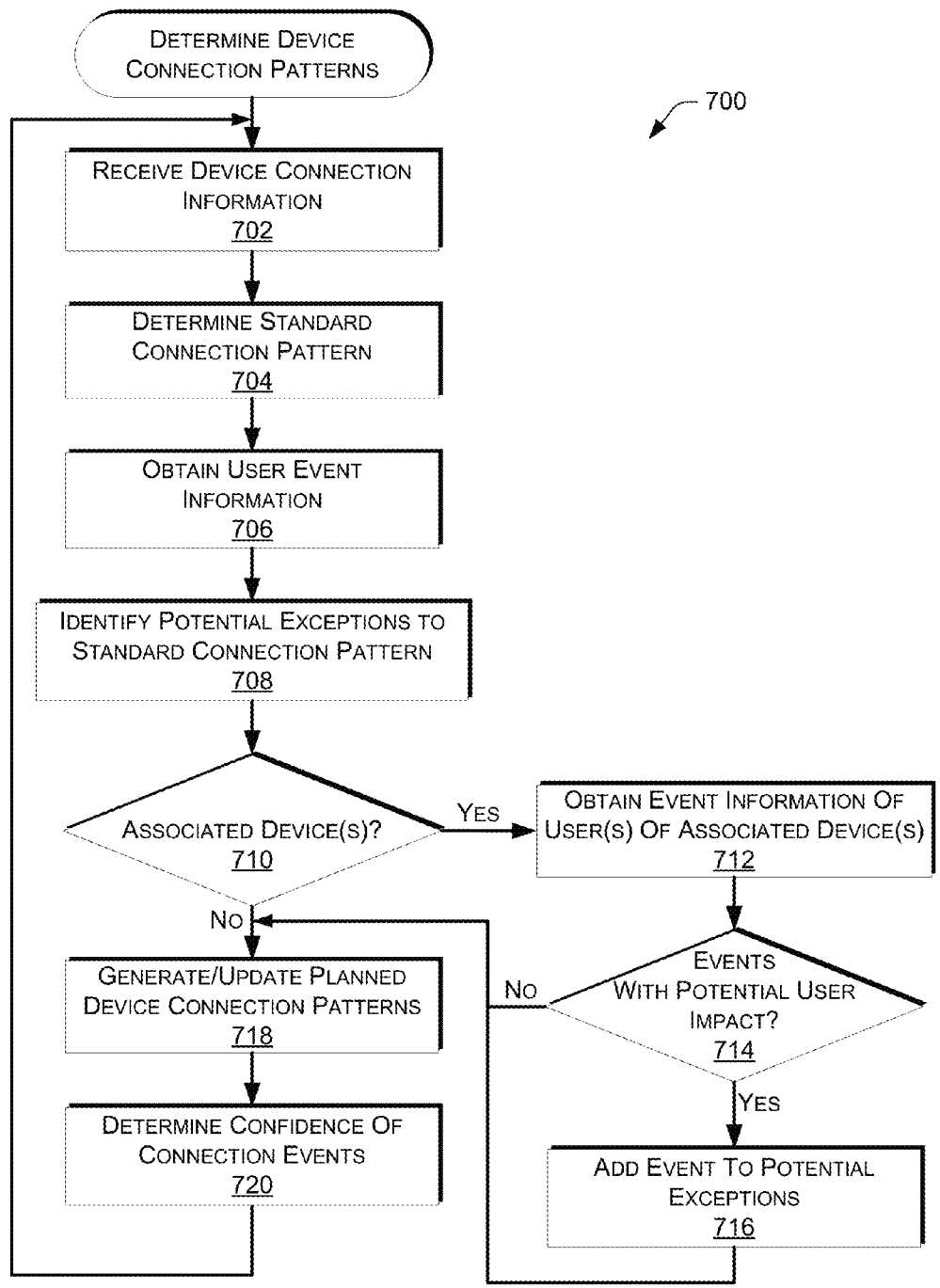
FIG. 7 illustrates an example process for determining device connection patterns, according to an implementation.

FIG. 7 illustrates an example process 700 for determining wireless device connection patterns, according to an implementation. The example process 700 and each of the other processes described herein are illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 700 begins upon receipt of device connection information, as in 702. For example, device connection information may identify the type of network to which the wireless device is connected, whether the wireless network is a secure or a known network, the location of the device, the signal strength and connection quality between the wireless device and the network, etc. As wireless device connection information is received, that information may be stored and aggregated over a period of time to determine recurring connection events that may be combined to develop a standard connection pattern. Standard connection patterns represent a typical connection event behavior pattern of a wireless device identifying the types of networks to which the wireless device connects during a period of time. For example, FIG. 8 provides a block diagram of a series of connection events that make up a device's determined standard connection pattern 800 for a twenty-four hour period, according to an implementation. The standard connection pattern 800 may be determined based on information collected over a period of time that has been aggregated to identify similarities in connection events of the wireless device. In this example, the standard connection pattern 800 may represent a standard connection event pattern for a wireless device during a user's typical workday, such as a Monday. As illustrated by the standard connection pattern 800, between 00:00-05:00 hours, the connection event 802 is typically that the wireless device is in an idle state connected to a fixed fee wireless network (in this example a home network) and the device is charging. Between the hours of 05:00 and 07:00, after the user has awakened, the connection event 804 illustrates that the device transitions to an active state, operates on battery power, but remains connected to the fixed fee wireless network (home network).

Next, the standard connection pattern 800 illustrates that between the hours of 07:00-08:00, the wireless device connection event 806 is that of an idle state, battery-powered, but connected to a variable fee wireless network. This period of time may be representative of time spent by the user commuting from their home to a train station where the device is idle in the user's car but connected to an operator's variable fee wireless network. As part of that commute, during the hour between 08:00-09:00, the device transitions to a connection event 808 in which it is unavailable. For example, the user may take a train or subway as part of their daily commute to work in which there is no wireless network to which the wireless device can connect. Even though the wireless device is not connected to a wireless network during this time, the user may still interact with the device (e.g., access program modules and consume information) and such interactions may be captured and stored on the wireless device. When a connection is re-established the usage information, including program module usage, time of access, information accessed, etc., may be provided.

At approximately 09:00, the wireless device connection event 810 occurs in which the wireless device is in an idle state, connected to a fixed fee wireless network (work) and remains on battery power. The connection event 810 typically remains active until 12:00. Between 12:00-13:00, the device typically operates in a connection event 812 such that the device is connected to a variable fee wireless network, battery operated and active. This may be representative of a time when the user takes a lunch break from work, leaves the office and goes out for a meal.

After lunch, the user typically returns to work and the wireless device undergoes another transition to a connection event 814 of an idle state, connected to a fixed fee wireless network (work) and remains on battery power. This connection event 814 may persist until the end of the users work day at approximately 17:00. During this standard twenty-four hour period, the user begins his/her commute home returning to the subway or train such that the device again experiences a connection event 816 and becomes unavailable, this time between 17:00-18:00. Next, the connection event 818 included in the standard connection pattern 800 illustrates that the wireless device reconnects with a variable fee network, remains in an idle state and continues operating on battery power.

When the user returns home with the wireless device, as illustrated by the connection event 820, the user continues to use the device, keeping it in an active state, on battery power but connected to a fixed fee wireless network between 19:00-22:00. Finally, the wireless device returns to a connection event 222 in which it is in an idle state, charging and connected to the fixed fee wireless network until the end of the twenty-four hour period.

Standard connection patterns may be developed over a period of time by collecting connection events over different days and identifying commonalities between determined periods of time. For example, some users may awake and go to sleep at approximately the same time every day and take the same path to and from work. Due to the regular user behavior, strong correlations can be drawn between multiple different days over a long period and connection events that make up a connection pattern may be anticipated with a high degree of probability.

Returning to FIG. 7, the example process 700 obtains user event information, as in 706. As discussed above, user event information may be obtained from a variety of sources, including information from program modules, external information, and/or directly from the user. For example, the example process 700 may query and identify user event information based off of the user's calendar and events and activities scheduled on the calendar. For example, FIG. 9 illustrates a block diagram 900 identifying a series of user events identified for a twenty-four hour period. In this example, a first user event 902 for the user is identified as an alarm that this is scheduled for 04:00. A second user event 904 is "Breakfast with Dan in Seattle" between 07:00-08:30. The third user event 906 is a Meeting with Steve between 09:30-10:00 followed by a user event 908 which is a call with John between 14:00-14:30. Finally, the next user event identified for the twenty-hour period is the user event 910 identifying a flight to Tokyo beginning at 17:00 and continuing until the end of the twenty-four hour period.

Standard connection patterns and user event information may be determined over a predetermined period of time that is continually updated and moved forward as time progresses. For example, standard connection patterns and user events may be determined and maintained for twenty-four hour periods. However, the twenty-four hours may be continually updated based on the increments in which wireless device connection information is received.

Returning to FIG. 7, based on the determined standard connection pattern and the identified user event information, potential exceptions to the standard connection pattern may be identified, as in 708. In some implementations, the standard connection pattern and user event information may be compared to identify user events that may alter or otherwise modify the standard connection pattern. For example, comparing the standard connection pattern 800 to the identified user event information 900, the example process 700 may determine the potential exceptions illustrated in FIG. 10. Specifically, FIG. 10 is a block diagram of determined wireless device connection pattern exceptions 1000 identified based on a device's determined standard connection pattern 800 and a user's identified event information 900 for a twenty-four hour period, according to an implementation. As shown, potential exceptions include the potential exception 1002 of the 04:00 alarm, the potential exception 1004 of Breakfast with Dan in Seattle from 07:00-08:30, the potential exception 1006 of a call with John from 13:45-14:45 and the potential exception 1008 of a flight to Tokyo from 17:30-23:59. Potential exceptions are any user events that may result in the standard connection pattern being modified as a result of the user's altered behavior.

For example, the user event 902 of a 04:00 alarm potentially impacts the standard connection pattern 800 in which the device typically remains in the connection event 802 in an idle state, charging and connected to a fixed fee wireless network until 05:00. At 05:00, the wireless device typically transitions to the connection event 804 of an active state, operating on battery but still connected to a fixed fee wireless network. These two events indicate that the user typically does not awaken until closer to 05:00. Thus, the user event 902 of the 04:00 alarm is identified as a potential exception 1002. Identifying the user event 902 as a potential exception may further be confirmed by comparing other user events that typically occur or coincide with the standard connection pattern. For example, it may be determined that a user event of an alarm is typically scheduled for 05:00 on days in which the connection event 802 and the connection event 804 occur.

Likewise, the user event 904 of breakfast with Dan in Seattle between 07:00 and 08:30 can be identified as a potential exception 1004 because the standard connection pattern illustrates that the user is typically commuting to work between the hours of 07:00-08:30, not in Seattle having breakfast. In this example, the user behavior that corresponds to the standard connection pattern may be determined based on additional information collected and stored as part of the connection events. Such information may include, but is not limited to, device location, user events, connections, etc. Likewise, the potential exception 1004 may be identified by analyzing the data or structure of the user event to identify not only a time of the user event but to also determine a potential location for the user event, in this example Seattle.

The user event 906 of a meeting with Steve does not create a potential exception because even though the user event exists, it may be determined that the meeting with Steve is part of the user's standard workweek and thus will not impact the standard connection pattern. However, the final two user events 908, 910 both result in potential exceptions 1008, 1010 because they do not correspond with the user's normal schedule and thus may alter the standard connection pattern 800. For example, between the hours of 17:00 to the end of the twenty-four hour period, the user is typically commuting home from work, using the wireless device at home and then charging the device while the user sleeps. In contrast, the user event 910 identifying that the user is scheduled for a flight to Tokyo is an exception to this standard connection pattern and user behavior.

Any type of user event or other information that may represent a deviation from the user's normal schedule may be identified as a potential exception.

Returning again to FIG. 7, upon identifying potential exceptions to the standard connection pattern, a determination is made as to whether there are any associated devices, as in 710. An associated device may be any other device associated with the wireless device and/or the user of the wireless device. For example, if the wireless device is a smart phone, the associated device may be a user's tablet. Likewise, multiple users (e.g. husband and wife) may identify respective wireless devices as associated devices so that information may be shared among those devices. If it is determined that there are associated devices, user event information for the users associated with those devices is obtained, as in 712. Event information of users associated with those associated devices may include additional user event information for the user of the wireless device or event information for another user.

The example process 700 may then determine whether any of the event information obtained from associated devices results in a potential overlap or other impact on the user of the wireless device, as in 714. If it is determined that there are potential events that may impact the user of the wireless device, the events are analyzed and, if necessary, added to the list of potential exceptions, as in 716.

If it is determined that there are no associated devices (block 710), there are no events with associated devices that result in potential user input (block 714) or after an event is added to a list of potential exceptions (block 716), device connection patterns are determined and/or updated, as in 718. For example, a comparison may be made between the standard connection pattern 800 and identified potential exceptions 1000 to adjust and/or modify the anticipated connection events that make up the standard connection pattern to develop a planned wireless device connection pattern, as illustrated in FIG. 11.

Specifically, FIG. 11 illustrates a block diagram of a device's determined planned connection pattern 1100 for a twenty-four hour period, according to an implementation. As shown in the planned connection pattern 1100, portions of the standard connection pattern 800 have been shifted to correspond with the anticipated modified behavior of the user based on the identified potential exceptions. In some instances, anticipated connection events have also been changed to correspond with the identified potential exceptions. For example, the connection event 802 in which the device is in an idle state, charging and connected to a fixed fee wireless network from the start of the twenty-four hour period until 05:00 is modified to account for the user event 902 of an alarm at 04:00. Specifically, in this example, the connection event is modified such that the connection event 1102 of the planned connection pattern 1100 in which the device is an idle state, charging, and connected to a fixed fee wireless network is anticipated to occur between the start of the twenty-four hour period and 04:00. At 0:400 the user wakes up and the wireless device likely transitions to the connection event 1104 in which the device is in an active state, operating on battery power, but still connected to the fixed fee wireless network. Likewise, the connection events 806, 808 that typically occur while the user is commuting to work between 07:00-09:00 are shifted such that the similar connection events 1106, 1108 are anticipated to occur earlier in the planned connection pattern 1100 to account for the user event 904 in which the user is planning to have breakfast with Dan in Seattle. Specifically, the example process is anticipating that the user will commute to Seattle earlier than normal so that the user can attend the scheduled breakfast meeting.

After the user event 904 of breakfast with Dan in Seattle, the user proceeds according to their typical behavior pattern and the standard connection pattern persists until the user event 908. Because the user event 908 of calling John between 14:00 and 14:30 is not part of the user's typical behavior, the example process 700 may create a larger anticipated connection event to account for the uncertainty. In this example, the connection event 1110 surrounding the scheduled user event 908 is scheduled to occur 15 minutes before the planned user event 908. In addition, in this example, because of the subsequent user event 910 of a flight to Tokyo, the planned connection pattern 1100 may account for the travel time required for the user to travel to the airport and check in for the flight. In this example, the travel time and the time required to check into the flight is determined to result in an anticipated connection event in which the wireless device is likely in an active state, operating on battery power, and connected to a variable fee wireless network. As a result, the anticipated connection event 1110 is scheduled to begin before the user event 908 of a call with John and continue until the user likely arrives at the airport at approximately 16:30.

Because the user of this device frequently travels, the example process 700 may use past experience to determine when the user will likely arrive at the airport and the type of connection event the wireless device will likely experience while at the airport before departing on the flight to Tokyo. As illustrated, it's anticipated in the planned connection pattern 1100 that the user will arrive at the airport at approximately 16:30 and the wireless device will transition to a connection event 1112 in which the device is operating in an active state, on battery power, but connected to a fixed fee wireless network (e.g., the WLAN available at the airport) and that the wireless device will remain in this connection event 1112 until it is powered off at the departure of the flight to Tokyo and transition to an unavailable connection event 1114.

In some implementations, anticipated connection events may be categorized into one or more classes. For example, as illustrated in FIG. 7, the various anticipated connection events are assigned to one of categories P1-P9:

| Category | Device Status | Connection Type | Power Source |
|---|---|---|---|
| P1 | Idle | Fixed Fee Wireless Network | Charging |
| P2 | Idle | Fixed Fee Wireless Network | Battery |
| P3 | Active | Fixed Fee Wireless Network | Charging |
| P4 | Active | Fixed Fee Wireless Network | Battery |
| P5 | Idle | Variable Fee Wireless Network | Charging |
| P6 | Idle | Variable Fee Wireless Network | Battery |
| P7 | Active | Variable Fee Wireless Network | Charging |
| P8 | Active | Variable Fee Wireless Network | Battery |
| P9 | | Unavailable | |

Additional or fewer categories may be established and used to determine when to plan a data exchange. For example, within any or each of categories P1-P4 there may be additional categories dependent upon whether the fixed fee wireless network is a secure or known network or a public network in which exchanged data may not be protected. Likewise, additional or fewer device information may be maintained for each category.

Returning again to FIG. 7, in some implementations, a confidence level of the occurrence of each of the anticipated connection events included in the planned connection pattern 1100 may be determined. For example, a confidence interval or likelihood of occurrence may be associated with each anticipated connection event based on a probability that the anticipated connection event will occur. For example, there is a high probability (90%) based off of past user behavior and the potential exceptions that the anticipated connection event 1102 will occur. However, in comparison, due to the uncertainty surrounding the user event 1006 in which the user is planning to call John, a lower degree of probability (33%) is assigned to the anticipated connection event 1110 because it may be difficult to determine where and for how long the user event will occur.

Figure 12:
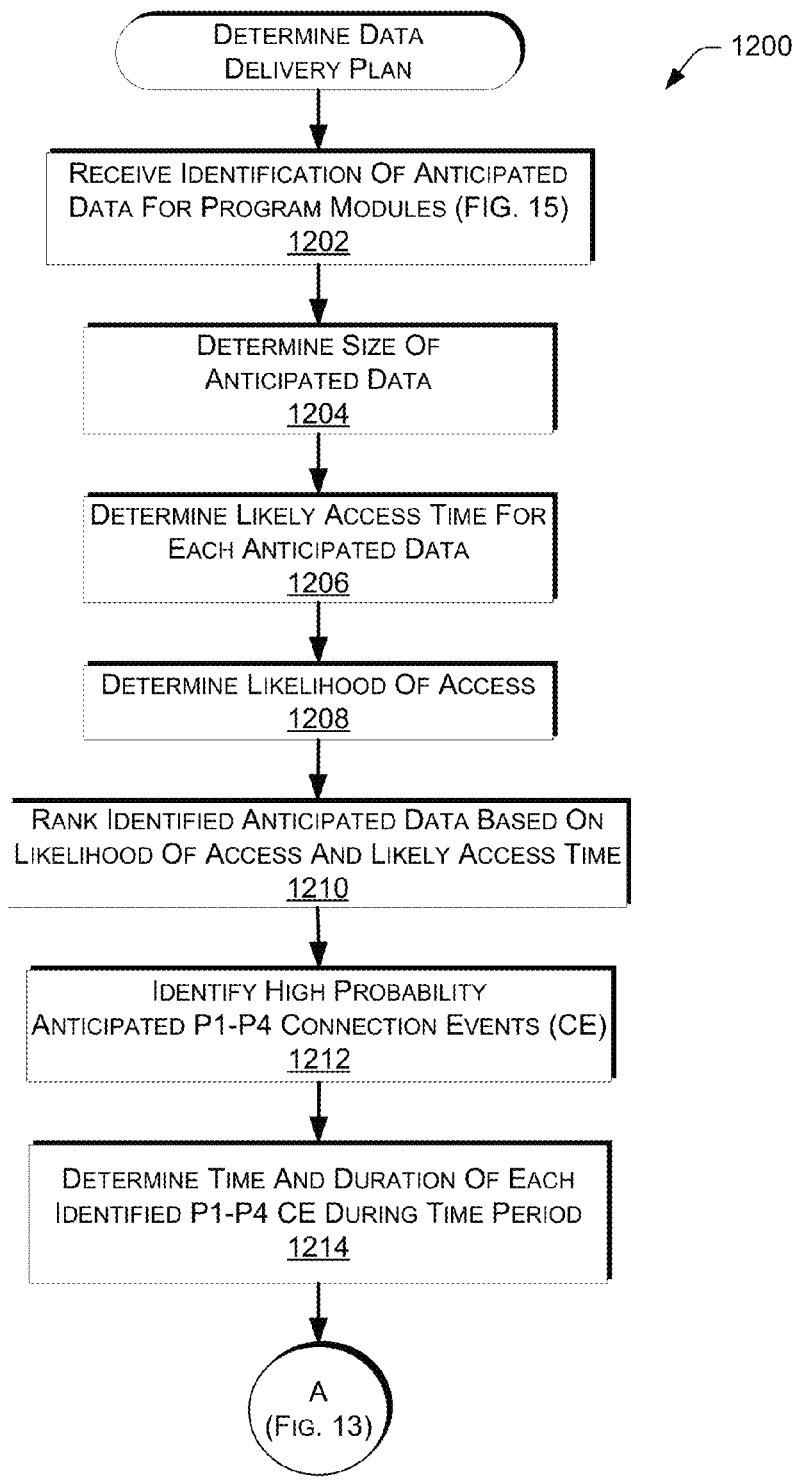
FIGS. 12 and 13 illustrate an example process for planning delivery of a set of data items, according to an implementation.
Figure 13:
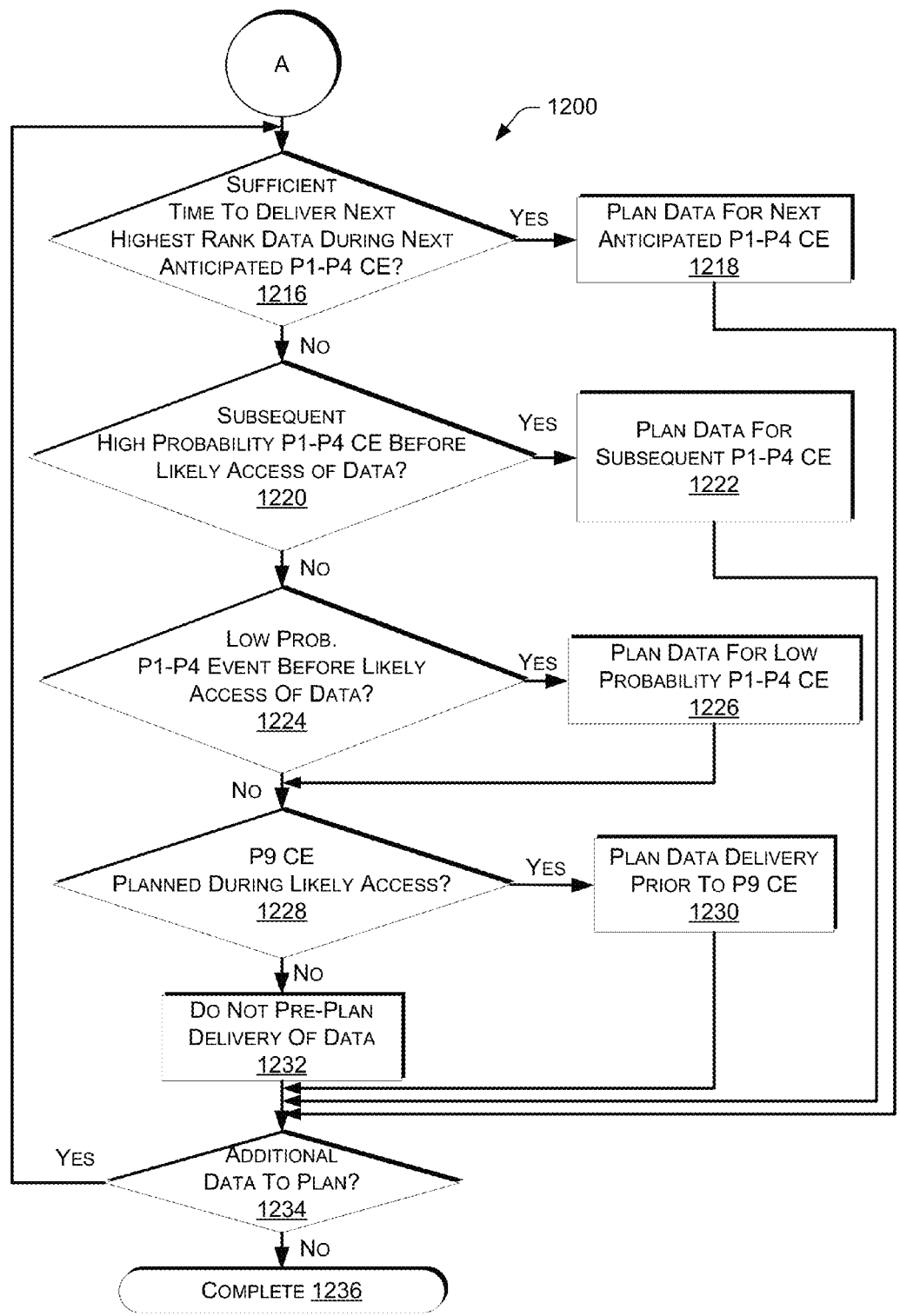

FIGS. 12 and 13 illustrate an example process 1200 for determining a data delivery plan, according to an implementation. The example process 1200 begins upon receipt of an identification of anticipated data for each of the program modules, as in 1202. As discussed above, the program modules of a wireless device and/or the respective program processing components of the communication management system may periodically identify program consumption information by the user of the wireless device and anticipated data that will likely be accessed in the near future through the respective program. For anticipated data, a determination is made as to the size of the identified anticipated data. The determined size may be used in computing an estimated data transfer time necessary to transfer the anticipated data between the communication management system and the wireless device, as in 1204.

In addition, a determination may be made as to the likely time of the data use within the predetermined timeframe that a user of the wireless device will access each identified anticipated data, as in 1206. For example, a user's past usage information for respective program modules may be utilized to determine when anticipated data use will likely occur by the user of the wireless device. In addition to determining the likely access time, the example process 1200 may also determine a probability or likelihood that the anticipated data will be accessed, as in 1208. Such information may also be determined from the collected program usage information and/or program consumption information by considering the frequency with which the user accesses the respective program module during a corresponding period of time. For example, if a user accesses a program module that provides stock related information every morning, it may be determined that there is a high likelihood of access of the anticipated data identified by that program module. Based on the determined likelihood of access and the determined likely access time, the identified anticipated data may be ranked, as in 1210. For example, anticipated data with the highest likelihood of access earliest in the time period under consideration may receive the highest rank or priority. Other anticipated data may be ranked or otherwise prioritized in a similar manner.

In addition to ranking or otherwise prioritizing the identified anticipated data, the example process 1200 may identify high probability P1-P4 anticipated connection events included in a planned connection pattern, as in 1212, and identify a time and duration of each of those anticipated connection events, as in 1214. As discussed above, anticipated connection events within a planned connection pattern may be assigned different probabilities representing the certainty in which those events are likely to occur. For example, connection events that occur on a regular schedule may be assigned a high probability of occurrence. To illustrate, referring back to the planned delivery schedule 1100, the connection event 1102, which is representative of the device being plugged in, charging and connected to the user's home fixed fee wireless network occurs on a consistent and recurring schedule and thus may be assigned a high probability of occurrence.

Referring now to FIG. 13, the example process 1200 continues and a determination is made as to whether sufficient time exists during the next to occur high probability P1-P4 anticipated connection event to allow delivery of the next highest-ranking identified anticipated data, as in 1216. In some implementations, a high probability P1-P4 anticipated connection event may be identified as any P1-P4 anticipated connection event for which a 50% or higher probability of occurrence has been assigned. In other implementations, different levels of probability or no probability of occurrence may be used in identifying P1-P4 anticipated connection events.

If it is determined that sufficient time does exist within the next high probability P1-P4 anticipated connection event, the anticipated data is planned for delivery during that anticipated connection event, as in 1218, and the example process continues to decision block 1234, as discussed below. However, if it is determined that sufficient time does not exist in the next high probability P1-P4 anticipated connection event, a determination is made as to whether there is a subsequent high probability P1-P4 connection event that is anticipated to occur before likely access of the anticipated data that will allow for sufficient time to deliver the anticipated data to the wireless device, as in 1220. If it is determined that a subsequent high probability P1-P4 anticipated connection event exists, the anticipated data is planned for delivery during the occurrence of that subsequent P1-P4 anticipated connection event, as in 1222. Once planned, the example process 1200 continues to decision block 1234, as discussed below.

If it is determined that a subsequent high probability P1-P4 anticipated connection event is not scheduled to occur before likely access of the anticipated data, a determination is made as to whether there is a low probability P1-P4 anticipated connection event planned to occur before likely access of the anticipated data that will allow sufficient time for delivery of the anticipated data, as in 1224. Similar to the above, if it is determined that there is a low probability P1-P4 connection event that is anticipated to occur before likely access of the anticipated data, the anticipated data is scheduled for delivery during the occurrence of that low probability P1-P4 anticipated connection event, as in 1226.

Finally, if it is determined that there are no high or low probability P1-P4 connection events anticipated to occur before likely access of the identified anticipated data or if the identified anticipated data is planned for delivery to occur during a low probability P1-P4 anticipated connection event, a determination may also be made as to whether likely access of the anticipated data may occur during an anticipated P9 connection event, as in 1228. If it is determined that access of the anticipated data is likely to occur during an anticipated P9 connection event, the example process 1200 may also plan delivery of the anticipated data to occur during a P5-P8 connection event anticipated to occur before the P9 connection event, as in 1230. This may be done to ensure delivery of the data item before the P9 connection event so it is available to the user even though a user may incur a charge for the delivery. Once planned, the example process 1200 continues to decision block 1234, as discussed below.

However, if it is determined that likely access of the anticipated data is not going to occur during an anticipated P9 connection event, the anticipated data may not be pre-planned for delivery, as in 1232, and a determination may be made as to whether additional data items exist for which planning is to be done, as in 1234. In other implementations, an additional determination may be made as to whether additional data can be transferred under a variable fee wireless connection without the user incurring an additional charge. If it is determined that a user is still under their variable fee transfer limits, the example process 1100 may consider the amount of time (e.g., days or weeks) remaining before the user of the wireless device loses credit for the available transfer of data. Based on those factors, it may be determined whether sufficient data transfer availability exists for the remainder of the period such that the anticipated data can be transferred during a P5-P8 anticipated connection event without the user incurring an additional charge. If sufficient data transfer remains, the anticipated data may be planned for transfer during a P5-P8 anticipated connection event.

Returning to FIG. 12, if it is determined that additional anticipated data exists for which planning is to occur, the example process 1200 returns to decision block 1216 and continues. However, if it is determined that planning for all anticipated data has completed, the example process 1200 completes, as in 1236.

Figure 14:
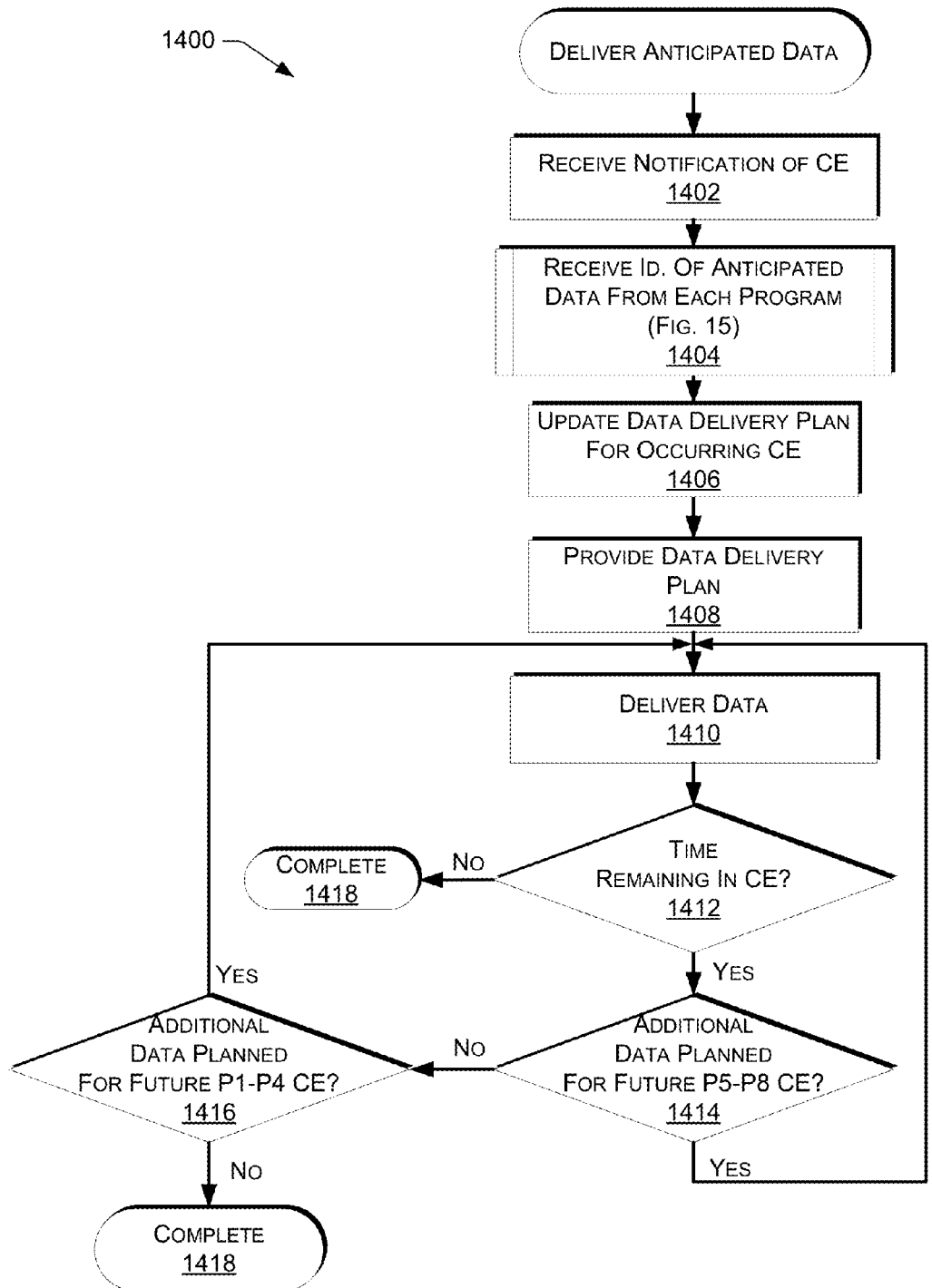
FIG. 14 illustrates an example process for delivering a set of data items during an anticipated connection event, according to an implementation.

FIG. 14 illustrates an example process 1400 for delivering data during an anticipated connection event, according to an implementation. The example process 1400 begins upon receipt of a notification of the occurrence of an anticipated connection event, as in 1402. In addition, an update to the identified anticipated data is received for each program, as in subroutine 1404. The process for identifying anticipated data and/or updating identified anticipated data is discussed below with respect to FIG. 15.

Upon receiving an update of anticipated data, the delivery plan for the occurring connection event may be updated to account for any differences between the anticipated data planned for delivery during the occurring connection event and the updated anticipated data, as in 1406. For example, if a prior anticipated connection event did not occur and not all of the data planned for delivery during that prior connection event has been delivered to the wireless device, the delivery plan for this anticipated connection event may be updated or adjusted to include the anticipated data if it is still likely that the user will access that data.

Once updated, the delivery plan corresponding to the occurring connection event may be provided to the respective program module processing components to enable delivery of the anticipated data included in the delivery plan, as in 1408. Upon delivering the updated delivery plan, the respective program processing components initiate delivery of the anticipated data, as in 1410, and the delivery may continue until either the connection event terminates or all of the anticipated data identified in the delivery plan is delivered.

Once the planned anticipated data has been delivered, a determination may be made as to whether time remains during the occurring connection event to deliver additional anticipated data, as in 1412. If it is determined that time remains in the occurring connection event, a determination is made as to whether there is anticipated data planned for a future anticipated P5-P8 connection events that can be delivered during the remaining time of the occurring connection event, as in 1414. If it is determined that anticipated data is planned for a future anticipated P5-P8 connection event that can be delivered during the remaining time of the occurring connection event, the example process 1400 may instruct delivery of that anticipated data, as in 1410. However, if it is determined that additional anticipated data is not planned for a future anticipated P5-P8 connection event, a determination may be made as to whether additional anticipated data is planned for a future P1-P4 anticipated connection event that may be delivered during the remaining time of the occurring connection event, as in 1416. If it is determined that delivery of anticipated data is planned for a future P1-P4 anticipated connection event and sufficient time exists during the occurring connection event to deliver that anticipated data, the example process 1400 may provide instructions to deliver that data, as in 1410. However, if it is determined that no time remains in the occurring connection event to deliver additional data, or if it is determined that there is no additional anticipated data to deliver, the example process completes as in 1418. As will be appreciated, the order of decision block 1414, 1416 may be reversed and anticipated data scheduled for a P1-P4 anticipated connection event identified and potentially delivered first. In another implementation, the example process 1414 may consider the ranking of anticipated data that has not yet been delivered and begin delivering data with the highest rank. Likewise, in some implementations, delivery of anticipated data beyond that of the anticipated data planned for the occurring connection event may only occur if the occurring connection event is one during which the device is idle, thereby not impacting any potential use of the device by a user.

Figure 15:
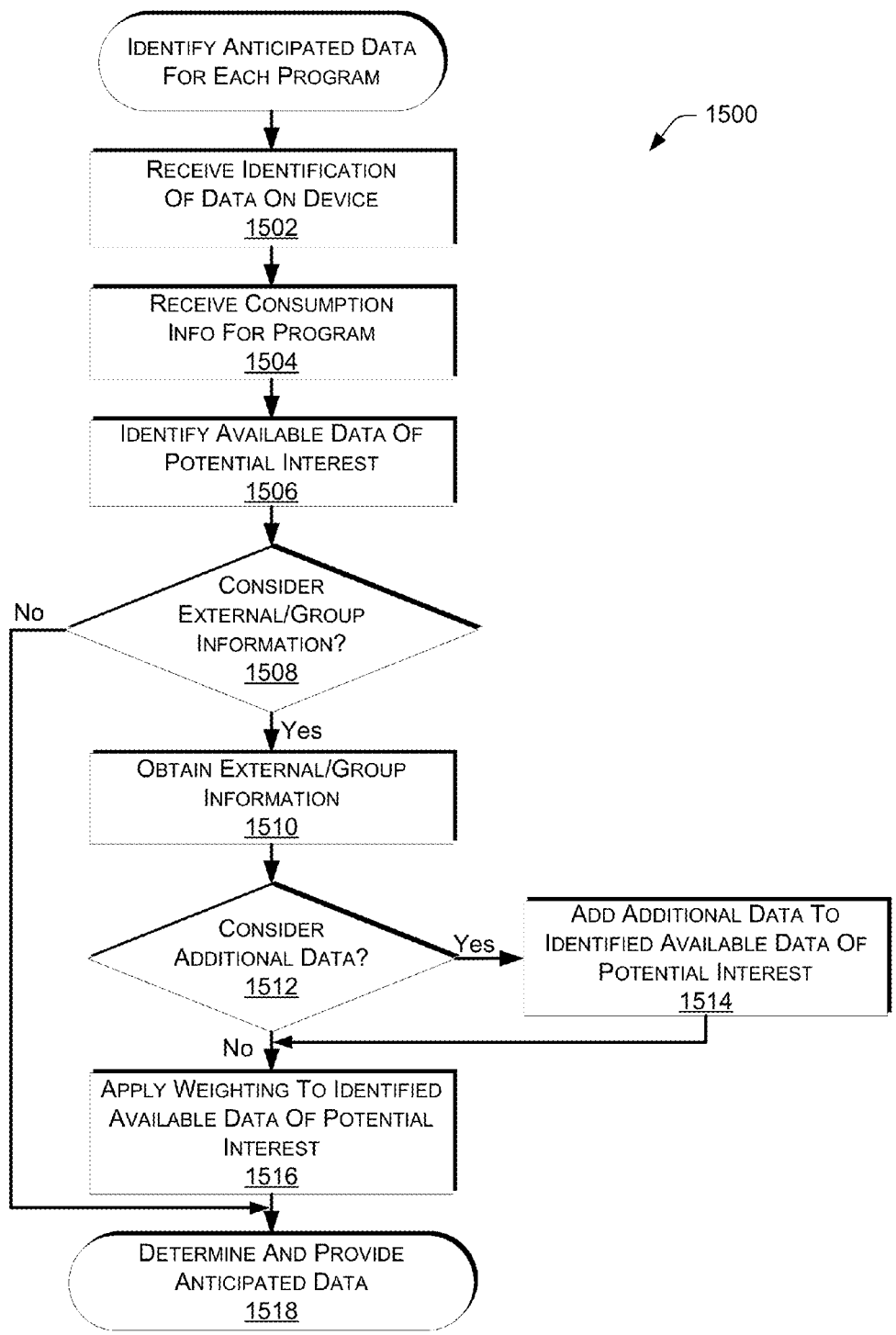
FIG. 15 illustrates an example process for anticipating data use by programs operating on a wireless device, according to an implementation.

FIG. 15 illustrates an example process 1500 for identifying anticipated data, or updating an identification of anticipated data for a program module operating on a wireless device, according to an implementation. The example process 1500 may be performed for each program module and each program module may independently, or collectively, provide an identification of anticipated data for that program module.

The example process 1500 begins upon receiving identification of data on the device for the program module, as in 1502. In some implementations, program usage information and/or program consumption information may be provided by the program module on the wireless device to identify the data stored and/or accessed by the program module. In addition, the identified data on the wireless device for the program module may include anticipated data that has previously been delivered and temporarily stored on the wireless device but not yet accessed by the program module.

The program usage information and/or the program consumption information may also be used to identify the consumption information for the program module on the wireless device, as in 1504. Based on the data stored on the wireless device and the consumption information for the program module, available data that may be of potential interest and likely accessed by a user of the program module on the wireless device is identified, as in 1506. As will be appreciated, a variety of techniques may be used to identify data of potential interest to a user. For example, if the data consumed by the program is a book or series of books, information about the series of books and/or information about what other users typically read upon completing the book that the user is currently consuming in the program module may be used to identify available data that will be of likely interest to the user. Any technique for identifying available data of interest may be used with the various implementations described herein.

Upon identifying data of potential interest to the user that may be accessed through the program module, a determination is made as to whether external and/or group information should also be considered, as in 1508. Such external information may be representative of events or information that are of high interest to external sources or that otherwise would not be identified as of potential interest to the user of the wireless device. For example, if the program is a news feed program module and the user typically only reviews and accesses political news from the program module, external information may be considered to identify other forms of news that even though not typical for the user may be of such a high interest that there is a probability that it will be accessed by the user. For example, if a major earthquake has occurred that is getting high news coverage or interest from external sources, even though it is not related to political information, it may be determined as of potential interest to the user. In some implementations, the external information may include information obtained for other program modules.

If it is determined that external and/or group information is to be considered, such information is obtained, as in 1510, and a determination is made as to whether additional data should be identified as data of potential interest to the user and likely accessed through the program module, as in 1512. If it is determined that additional data is to be considered, the additional data is identified and included in the identification of available data that may be of potential interest to the user and accessed through the program module, as in 1514. After including the identified additional data or if it is determined that no additional data is to be included in the available data that may be of interest and accessed by the user, a weighting factor may be applied to one or more of the identified available data, as in 1516. For example, some items of available data already identified as of potential interest to the user may be given a higher probability of access due to external information or other group information relevant to that data. Upon identifying data of potential interest to the user that may be accessed through the program and optionally applying a weighting factor to one or more of those items based on external and/or group information, the data or data items with the highest probability of access are identified as anticipated data and provided back to the example process 1200 and/or 1400, as in 1518.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system for managing communication, comprising:
a data processing component for:
receiving wireless device information and user event information from a wireless device;
determining a planned connection pattern for the wireless device, wherein the planned connection pattern includes a first anticipated fixed fee wireless network connection event anticipated to occur at a first time, a second anticipated fixed fee wireless network connection event anticipated to occur at a second time, and an anticipated variable fee wireless network connection event anticipated to occur at a third time, wherein the first time is before the third time and the second time is before the third time;
determining a first anticipated duration of the first anticipated fixed fee wireless network connection event;
determining a second anticipated duration of the second anticipated fixed fee wireless network connection event;
a program processing component for receiving program module usage information and identifying anticipated data that will likely be requested by a user during an occurrence of the variable fee wireless network connection event;
the data processing component further for:
determining an estimated transfer time needed to transfer the anticipated data to the wireless device;
determining that the first anticipated duration of the first anticipated fixed fee wireless network connection event is not sufficient to transfer the anticipated data to the wireless device;
determining that the second anticipated duration of the second anticipated fixed fee wireless network connection event is sufficient to transfer the anticipated data to the wireless device; and
planning, prior to an occurrence of the first anticipated fixed fee wireless network connection event and prior to the occurrence of the second anticipated fixed fee wireless network connection event, delivery of the anticipated data to the wireless device over a fixed fee wireless network to occur during the occurrence of the second fixed fee wireless network connection event such that the anticipated data is available to the user when requested.

2. The system as recited in claim 1, wherein the first fixed fee wireless network is a wireless network in which the user does not incur a charge for delivery of data through the wireless network.

3. The system as recited in claim 1, wherein the anticipated variable fee wireless network connection event is a connection between the wireless device and a variable fee wireless network.

4. The system as recited in claim 3, wherein the variable fee wireless network is a wireless network in which the user does incur a charge for delivery of data through the wireless network.

5. The system as recited in claim 1, wherein the first anticipated fixed fee wireless network connection event is determined based at least in part on the user event information and the wireless device information.

6. The system as recited in claim 1, wherein the first anticipated fixed fee wireless network connection event is determined based at least in part on a standard connection pattern and received user event information.

7. The system as recited in claim 1, wherein the data processing component is further for determining a confidence of at least one of the first fixed fee wireless network connection event occurring or the second fixed fee wireless network connection event occurring; and
wherein planning includes determining that the second anticipated fixed fee wireless network connection event has a high confidence of occurring.

8. A computer implemented method, comprising:
under control of one or more computing systems configured with executable instructions, determining a planned connection pattern for a wireless device, wherein the planned connection pattern includes:
an anticipated fixed fee wireless network connection event; and
at least one of an anticipated variable fee wireless network connection event or an anticipated unavailable connection event, wherein the anticipated fixed fee wireless network connection event is anticipated to occur before the at least one of the anticipated variable fee wireless network connection event or the anticipated unavailable connection event;
determining, prior to an occurrence of the anticipated fixed fee wireless network connection event, a first anticipated data use time representative of a first anticipated time at which a first anticipated data may be requested by a user of a wireless device, wherein the first anticipated data use time is anticipated to occur during the at least one of the anticipated variable fee wireless network connection event or the anticipated unavailable connection event; and
determining, prior to the occurrence of the fixed fee wireless network connection event;
a second anticipated data use time for a second anticipated data; and
a first likelihood that the first anticipated data will be requested by the user of the device before the second anticipated data is requested by the user of the device;
a second likelihood that the second anticipated data will be requested by the user of the device before the first anticipated data is requested by the user of the device;
determining that the first likelihood is higher than the second likelihood; and planning, prior to the occurrence of the fixed fee wireless network connection event, delivery of the first anticipated data to the wireless device over a fixed fee wireless network during the anticipated fixed fee wireless network connection event.

9. A computer-implemented method of claim 8, wherein determining the anticipated fixed fee wireless network connection event further includes:
determining that an anticipated duration of the anticipated fixed fee wireless network connection event will be sufficient to deliver the first anticipated data to the wireless device during the occurrence of the anticipated fixed fee wireless network connection event.

10. A computer-implemented method of claim 8, wherein determining the anticipated fixed fee wireless network connection event includes:
determining an anticipated fixed fee wireless network connection event that is anticipated to occur before the wireless device is unavailable.

11. A computer-implemented method of claim 8,
the method further comprising, the one or more computing systems configured with executable instructions, determining a second anticipated fixed fee wireless network connection event anticipated to occur prior to the anticipated data use and prior to the anticipated fixed fee wireless network connection event; and determining that the second anticipated fixed fee wireless network connection event is a low probability wireless network connection event; and wherein planning, prior to the occurrence of the fixed fee wireless network connection event, delivery of the first anticipated data to the wireless device over the fixed fee wireless network during the anticipated fixed fee wireless network connection event is based at least in part on determining that the second anticipated fixed fee wireless network connection event is a low probability wireless network connection event.

12. A non-transitory computer-readable storage medium storing instructions that when executed by a processor cause the processor to at least:

determine a planned connection pattern for a wireless device, wherein the planned connection pattern includes:

an anticipated fixed fee wireless network connection event anticipated to occur at a first time, an anticipated variable fee wireless network connection event anticipated to occur at a second time, and an anticipated unavailable connection event anticipated to occur at a third time during which the wireless device is unavailable, wherein the first time is before the third time and the second time is before the third time;

determine anticipated data that will likely be requested by a user of the wireless device during the anticipated unavailable connection event;

determine a first anticipated duration of the anticipated fixed fee wireless network connection event;

determine an estimated transfer time needed to transfer the anticipated data to the wireless device;

determine that the first anticipated duration of the anticipated fixed fee wireless network connection event is sufficient to transfer the anticipated data to the wireless device; and plan, prior to the third time, delivery of the anticipated data to occur during an occurrence of the anticipated fixed fee wireless network connection event.

13. The non-transitory computer-readable storage medium of claim 12, wherein the anticipated data is identified based at least in part on information received from the wireless device.

14. The non-transitory computer-readable storage medium of claim 12, wherein the anticipated data is identified based at least in part on user event information.

15. The non-transitory computer-readable storage medium of claim 12, wherein the anticipated data is identified based at least in part on external information.

16. The non-transitory computer-readable storage medium of claim 12, wherein the anticipated data includes a plurality of data that has not been requested by the wireless device.

17. The non-transitory computer-readable storage medium of claim 12, wherein the planned connection pattern is determined based at least in part on a determined standard connection pattern and user event information, the planned connection pattern based at least in part on exceptions to the standard connection pattern determined from the user event information.

18. The non-transitory computer-readable storage medium of claim 12, the instructions that when executed by the processor further cause the processor to at least:

determine that the wireless device will be connected to a power source and charging during the anticipated fixed fee wireless network connection event.

19. The non-transitory computer-readable storage medium of claim 12, the instructions that when executed by the processor further cause the processor to at least:

determine that the wireless device will be idle during the anticipated fixed fee wireless network connection event.

* * * * *